US008946356B2

(12) United States Patent
I et al.

(10) Patent No.: US 8,946,356 B2
(45) Date of Patent: Feb. 3, 2015

(54) RESIN COMPOSITION AND METHOD OF PRODUCING THE SAME

(75) Inventors: Shunichiro I, Tokyo (JP); Koichiro Yoshida, Tokyo (JP); Takaaki Miyoshi, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 14/130,743

(22) PCT Filed: Jul. 5, 2012

(86) PCT No.: PCT/JP2012/067224
§ 371 (c)(1),
(2), (4) Date: Mar. 5, 2014

(87) PCT Pub. No.: WO2013/005806
PCT Pub. Date: Jan. 10, 2013

(65) Prior Publication Data
US 2014/0206810 A1    Jul. 24, 2014

(30) Foreign Application Priority Data

Jul. 5, 2011  (JP) ................................. 2011-149433
Feb. 16, 2012  (JP) ................................. 2012-031540

(51) Int. Cl.
*C08L 71/12* (2006.01)
*C08L 23/10* (2006.01)
*C08L 23/12* (2006.01)

(52) U.S. Cl.
USPC .......... 525/391; 525/92 R; 525/534; 525/416; 524/451

(58) Field of Classification Search
USPC ................. 525/534, 416, 391, 92 R; 524/451
See application file for complete search history.

(56) References Cited

U.S. PATENT DOCUMENTS

| 3,257,357 | A | 6/1966 | Stamatoff |
| 3,257,358 | A | 6/1966 | Stamatoff |
| 3,281,383 | A | 10/1966 | Zelinsky |
| 3,306,874 | A | 2/1967 | Hay |
| 3,306,875 | A | 2/1967 | Hay |

(Continued)

FOREIGN PATENT DOCUMENTS

| GB | 1020720 A | 2/1966 |
| GB | 1130770 A | 10/1968 |

(Continued)

OTHER PUBLICATIONS

European search report issued with respect to application No. 12807047.1, mail date is Jun. 23, 2014.

(Continued)

*Primary Examiner* — Rip A. Lee
(74) *Attorney, Agent, or Firm* — Greenblum & Bernstein, P.L.C.

(57) ABSTRACT

A resin composition having a high thermal aging property and molding stability in mass production of molded articles while keeping molding fluidity and thermal creep resistance is provided. A resin composition, containing 100 parts by mass in total of a polypropylene resin (a) and a polyphenylene ether resin (b), and 1 to 20 parts by mass of a compatibilizer (c), wherein in the component (a), the proportion of the component having a molecular weight of 30,000 or less is from 3.0 to 5.1% of the entire component (a), and the proportion of the component having a molecular weight of 10,000,000 or more is from 1.0 to 1.6% of the entire component (a).

15 Claims, 3 Drawing Sheets

(56) References Cited

U.S. PATENT DOCUMENTS

| | | | |
|---|---|---|---|
| 3,333,024 A | 7/1967 | Haefele | |
| 3,639,517 A | 2/1972 | Kitchen | |
| 3,929,930 A | 12/1975 | Izawa | |
| 4,011,200 A | 3/1977 | Yonemitsu | |
| 4,192,828 A | 3/1980 | Witschard | |
| 4,501,857 A | 2/1985 | Kishimoto | |
| 4,987,194 A | 1/1991 | Maeda | |
| 5,780,180 A | 7/1998 | Okamoto | |
| 6,045,883 A | 4/2000 | Akiyama | |
| 6,602,637 B1 | 8/2003 | Kurasawa | |
| 2010/0105837 A1* | 4/2010 | Sasaki et al. | 525/93 |
| 2011/0027659 A1 | 2/2011 | Kikuchi | |
| 2013/0231430 A1* | 9/2013 | I et al. | 524/323 |

FOREIGN PATENT DOCUMENTS

| | | |
|---|---|---|
| JP | 47-011486 A | 6/1972 |
| JP | 49-066743 A | 6/1974 |
| JP | 50-051197 A | 5/1975 |
| JP | 50-075651 A | 6/1975 |
| JP | 52-017880 B | 5/1977 |
| JP | 54-126255 A | 10/1979 |
| JP | 56-010542 A | 2/1981 |
| JP | 56-062847 A | 5/1981 |
| JP | 56-100840 A | 8/1981 |
| JP | 63-152628 A | 6/1988 |
| JP | 02-300218 A | 12/1990 |
| JP | 08-195188 A | 7/1996 |
| JP | 09-120801 A | 5/1997 |
| JP | 09-241451 A | 9/1997 |
| JP | 11-140245 A | 5/1999 |
| JP | 2000-058007 A | 2/2000 |
| JP | 2002-060562 A | 2/2002 |
| JP | 2002-063873 A | 2/2002 |
| JP | 2008-195801 A | 8/2008 |
| JP | 2008-297476 A | 12/2008 |
| JP | 2010-229348 A | 10/2010 |
| JP | 2010-254994 A | 11/2010 |
| JP | 2011-190358 A | 9/2011 |
| JP | 2011-255652 A | 12/2011 |
| JP | 2012-149125 A | 9/2012 |
| WO | 97-01600 A | 1/1997 |
| WO | 2008-123240 A | 10/2008 |
| WO | 2009-122961 A | 10/2009 |
| WO | 2012-049743 A | 4/2012 |

OTHER PUBLICATIONS

Hampton, Analytical Chemistry, vol. 21, No. 8, Aug. 1949, pp. 923-926.

Search report from International Application No. PCT/JP2012/067224, mail date is Sep. 18, 2012.

* cited by examiner

RESIN COMPOSITION AND METHOD OF PRODUCING THE SAME

TECHNICAL FIELD

The present invention relates to a resin composition and a method of producing the same.

BACKGROUND ART

Polyphenylene ether resins are widely known as the resin having high heat resistance, mechanical properties, flame retardancy, and electrical properties. The polyphenylene ether resins having such properties are used in broad ranges of applications such as automobile parts, electrical and electronic parts, business apparatuses, industrial products, and construction materials, and have recently received attention as a resin material for forming a sealed type secondary battery container. The sealed type secondary battery container is known as a nickel-hydrogen battery or the like, and widely used as power sources for vehicles such as automobiles and a variety of electrical products and industrial apparatuses. The demand for the sealed type secondary battery container has been increasing. The performance of the battery main body is improved with this increasing demand, and the battery container itself has been reduced in size and weight and the electric capacity of the battery has been increased.

In the related art, as the resin for forming a secondary battery container (resin for a secondary battery container), ABS resins and a modified polyphenylene ether resins are used from the viewpoint of molding properties and heat resistance, for example. Unfortunately, these resins have poor anti-hydrogen permeability, and cause reduction in the performance of the battery. Moreover, the ABS resins and the modified polyphenylene ether resins have poor resistance against chemicals. For this reason, these resins have insufficient resistance against chemicals such as automobile oils, and cannot be used for the secondary battery container for automobiles or the like for a long time.

To solve these problems, for example, Patent Document 1 discloses a sealed type secondary battery container comprising a resin composition containing a crystalline polyolefin resin and a polyphenylene ether-based resin. Patent Document 2 discloses a sealed type secondary battery container using a polymer alloy comprising a polyphenylene ether resin and a polyolefin resin. Patent Document 3 discloses a resin composition in which a polyphenylene ether resin is dispersed in a specific form in a crystalline polypropylene resin. Patent Documents 4 to 6 each disclose a resin composition comprising a polyphenylene ether-based resin and a crystalline polypropylene having a specific structure, the resin composition being usable as a container for a sealed type secondary battery. Patent Document 7 discloses a composition in which reduction in flow marks are tried. Patent Document 8 discloses a composition in which improvement in molding fluidity is tried.

PATENT DOCUMENTS

Patent Document 1: Japanese Patent Laid-Open Publication No. 08-195188
Patent Document 2: Japanese Patent Laid-Open Publication No. 09-120801
Patent Document 3: International Publication No. WO 97/001600
Patent Document 4: Japanese Patent Laid-Open Publication No. 2000-058007
Patent Document 5: Japanese Patent Laid-Open Publication No. 2002-060562
Patent Document 6: Japanese Patent Laid-Open Publication No. 2002-063873
Patent Document 7: Japanese Patent Laid-Open Publication No. 09-241451
Patent Document 8: Japanese Patent Laid-Open Publication No. 11-140245

SUMMARY OF THE INVENTION

Problems to be Solved by the Invention

The secondary battery container has been increasingly used in severe environments such as under a high temperature environment, e.g. an engine compartment of an automobile. For this reason, the resin composition used for the material for a secondary battery container or the like needs to meet requirements such as retention of mechanical strength and thermal creep resistance at a high level, for example, when the resin composition is used under a high temperature environment for a long time. Additionally, requirements in shape such as increase in size and reduction in thickness have been increased in the secondary battery container.

To produce such a secondary battery container well, the resin composition as the raw material needs to have high molding fluidity or the like. Generally, however, mechanical strength is a property incompatible with molding fluidity, and these two properties are difficult to simultaneously meet at a high level. Moreover, if the molding condition fluctuates during mass production of the secondary battery container, the metal mold filling rate may fluctuate. For this reason, further improvement in mass production stability is also required.

Unfortunately, the composition disclosed in Patent Document 7 improves rigidity and reduces flow marks by using a polypropylene having a high molecular weight, but does not improve molding fluidity sufficiently. The composition described in Patent Document 8 improves the melt flow rate (MFR) by using polypropylenes having different MFRs, but does not improve molding fluidity or reduce flow marks sufficiently. Furthermore, a pin gate is often used these days to make the molding mark unnoticeable when a large part or the like is molded. For this reason, reduction in flow marks under severer conditions is required. As above, the resin compositions in the related art are still sufficiently susceptible to improvement for the resin composition to simultaneously meet the physical properties above and the like in a good balance.

A first object of the present invention is to provide a resin composition having a high thermal aging property and molding stability in mass production of molded articles while keeping molding fluidity and thermal creep resistance. A second object of the present invention is to provide a resin composition having higher molding fluidity and reduced flow marks while keeping rigidity and impact resistance.

Means for Solving the Problems

As a result of intensive research to solve the problems, the present inventors found that the problems can be solved if a resin composition contains at least a specific propylene resin, polyphenylene ether, and a compatibilizer in a specific proportion, and have completed the present invention.

Namely, the present invention is as follows.

[1]
A resin composition, comprising:
100 parts by mass in total of a polypropylene resin (a) and a polyphenylene ether resin (b), and
1 to 20 parts by mass of a compatibilizer (c),
wherein in the component (a),
a proportion of a component having a molecular weight of 30,000 or less, which is determined by gel permeation chromatography (GPC, mobile phase: o-dichlorobenzene, standard substance: polystyrene), is from 3.0 to 5.1% of the entire component (a), and a proportion of a component having a molecular weight of 10,000,000 or more is from 1.0 to 1.6% of the entire component (a).

[2]
The resin composition according to [1], further comprising 5 to 50 parts by mass of a filler (d) based on 100 parts by mass in total of the component (a) and the component (b).

[3]
The resin composition according to [1] or [2], wherein molecular weight distribution of the component (a) (weight average molecular weight (Mw)/number average molecular weight (Mn)) is from 8 to 11.

[4] The resin composition according to any one of [1] to [3], wherein the component (c) is one or more selected from the group consisting of hydrogenated block copolymers, copolymers having polystyrene-polyolefin chain, and copolymers having polyphenylene ether-polyolefin chain.

[5]
The resin composition according to any one of [1] to [4], wherein the component (c) is a hydrogenated block copolymer prepared by hydrogenating at least part of a block copolymer including a polymer block A mainly containing a vinyl aromatic compound and a polymer block B mainly containing a conjugated diene compound in which a total amount of an amount of 1,2-vinyl bonding and an amount of 3,4-vinyl bonding is from 30 to 90% based on a total amount of an amount of vinyl bonding contained in the conjugated diene compound that forms the polymer block.

[6]
The resin composition according to [5], wherein in the polymer block B, the total amount of the amount of 1,2-vinyl bonding and the amount of 3,4-vinyl bonding is from 65 to 90% based on the total amount of the amount of vinyl bonding contained in the conjugated diene compound that forms the polymer block.

[7]
The resin composition according to any one of [2] to [6], wherein the component (d) is talc.

[8]
The resin composition according to any one of [1] to [7], having a matrix phase comprising the component (a) and a dispersed phase comprising the component (b).

[9]
A resin composition, comprising 100 parts by mass in total of a polypropylene resin (a) and a polyphenylene ether resin (b), 1 to 20 parts by mass of a compatibilizer (c), and 5 to 50 parts by mass of a filler (d),
wherein in the component (a), a proportion of a component having a molecular weight of 30,000 or less, which is determined by gel permeation chromatography (GPC, mobile phase: o-dichlorobenzene, standard substance: polystyrene), is from 1.0 to 5.1% of the entire component (a), and a proportion of a component having a molecular weight of 10,000,000 or more is from 0.5 to 1.6% of the entire component (a).

[10]
A method of producing the resin composition according to any one of [1] to [9], wherein the component (a) comprises a polypropylene resin (a-1): a melt flow rate (230° C., load: 2.16 kg) of 0.1 to 1 g/10 min, and a polypropylene resin (a-2): a melt flow rate (230° C., load: 2.16 kg) of 4 to 9 g/10 min, and
a mass ratio ((a-1)/(a-2)) of the component (a-1) to the component (a-2) is from 75/25 to 90/10,
the method comprising steps (1-1) and (1-2):
step (1-1): a step of melt kneading the component (a-2), the component (b), and the component (c) to obtain a kneaded product, and
step (1-2): a step of adding the component (a-1) to the kneaded product obtained in step (1-1), and performing melt kneading.

[11]
A method of producing the resin composition according to any one of [1] to [9], wherein the component (a) comprises a polypropylene resin (a-1): a melt flow rate (230° C., load: 2.16 kg) of 0.1 to 1 g/10 min, and a polypropylene resin (a-2): a melt flow rate (230° C., load: 2.16 kg) of 4 to 9 g/10 min, and
a weight ratio ((a-1)/(a-2)) of the component (a-1) to the component (a-2) is from 75/25 to 90/10,
the method comprising steps (2-1) and (2-2):
step (2-1): a step of melt kneading part of the component (a-2), the component (b), and the component (c) to obtain a kneaded product, and
step (2-2): a step of adding the rest of the component (a-2) and the component (a-1) to the kneaded product obtained in step (2-1), and performing melt kneading.

[12]
A method of producing the resin composition according to any one of [2] to [9], wherein the component (a) comprises a polypropylene resin (a-1): a melt flow rate (230° C., load: 2.16 kg) of 0.1 to 1 g/10 min, and a polypropylene resin (a-2): a melt flow rate (230° C., load: 2.16 kg) of 4 to 9 g/10 min, and
a weight ratio ((a-1)/(a-2)) of the component (a-1) to the component (a-2) is from 70/30 to 90/10,
the method comprising steps (3-1), (3-2), and (3-3):
step (3-1): a step of melt kneading the whole of the component (a-2), the whole of the component (b), and part or the whole of the component (c) to obtain a kneaded product,
step (3-2): a step of adding the whole of the component (a-1), part or the whole of the component (d), and the rest of the component (c) (excluding when the whole of the component (c) is used in step (3-1)) to the kneaded product obtained in step (3-1), and performing melt kneading to obtain a kneaded product, and
step (3-3): a step of adding the rest of the component (d) (excluding when the whole of the component (d) is used in step (3-2)) to the kneaded product obtained in step (3-2), and performing melt kneading.

[13]
A method of producing the resin composition according to any one of [2] to [9], wherein the component (a) comprises a polypropylene resin (a-1): a melt flow rate (230° C., load: 2.16 kg) of 0.1 to 1 g/10 min, and a polypropylene resin (a-2): a melt flow rate (230° C., load: 2.16 kg) of 4 to 9 g/10 min, and
a weight ratio ((a-1)/(a-2)) of the component (a-1) to the component (a-2) is from 70/30 to 90/10,
the method comprising steps (4-1), (4-2), and (4-3):
step (4-1): a step of melt kneading part of the component (a-2), the whole of the component (b), and part or the whole of the component (c) to obtain a kneaded product,
step (4-2): a step of adding the rest of the component (a-2), the rest of the component (c) (excluding when the whole of the component (c) is used in step (4-1)), the whole of the component (a-1), and part or the whole of the component (d) to the kneaded product obtained in step (4-1), and performing melt kneading to obtain a kneaded product, and step (4-3): a step of adding the rest of the component (d) (excluding when the whole of the component (d) is used in step (4-2)) to the kneaded product obtained in step (4-2), and performing melt kneading.

[14]

A resin composition obtained by the method according to any one of [10] to [13].

[15]

A molded article comprising the resin composition according to any one of [1] to [9].

Advantageous Effects of the Invention

The present invention can provide a resin composition having a high thermal aging property and molding stability in mass production while keeping molding fluidity and thermal creep resistance. The present invention can also provide a resin composition having higher molding fluidity to reduce flow marks while keeping rigidity and impact resistance.

MODES FOR CARRYING OUT THE INVENTION

Figure 1:
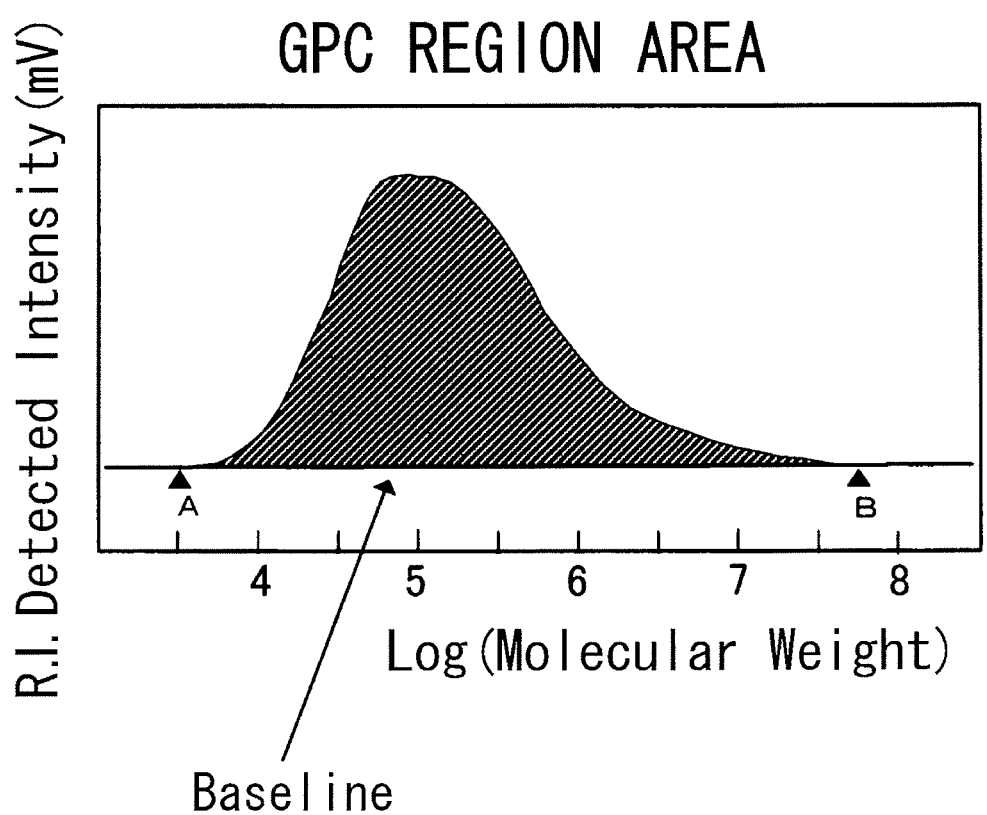
FIG. 1 is a conceptual diagram for describing a region area in a GPC elution curve.

Hereinafter, an embodiment for implementing the present invention (hereinafter referred to as "the present embodiment") will be specifically described. The present invention will not be limited to the embodiment below, and can be modified in various ways within the scope of the gist and implemented.

A first aspect of the resin composition according to the present embodiment is a resin composition comprising 100 parts by mass in total of a polypropylene resin (a) and a polyphenylene ether resin (b) and 1 to 20 parts by mass of a compatibilizer (c), wherein in the component (a), the proportion of a component having a molecular weight of 30,000 or less determined from gel permeation chromatography is from 3.0 to 5.1% of the entire component (a), and the proportion of a component having a molecular weight of 10,000,000 or more is from 1.0 to 1.6% of the entire component (a). The resin composition according to the first aspect has a high thermal aging property and molding stability in mass production of molded articles while keeping molding fluidity and thermal creep resistance.

The content of the component (a) based on 100 parts by mass in total of the component (a) and the component (b) is preferably from 25 to 98 parts by mass, more preferably from 30 to 98 parts by mass, still more preferably from 50 to 95 parts by mass, and further still more preferably from 70 to 95 parts by mass. The content of the component (c) based on 100 parts by mass in total of the component (a) and the component (b) is preferably from 1 to 15 parts by mass, and more preferably from 1 to 10 parts by mass. At contents of the components (a) to (c) in the range above, a resin composition having higher molding fluidity and thermal creep resistance is obtained.

<Component (a)>

The polypropylene resin (a) will be specifically described.

The polypropylene resin (a) (hereinafter also abbreviated to "PP") may be a propylene homopolymer, a copolymer of propylene and another monomer, or a modified product thereof. The component (a) is preferably crystalline, and more preferably a crystalline propylene homopolymer or a crystalline propylene-ethylene block copolymer.

Examples of another monomer copolymerizable with propylene may include α-olefins such as butene-1 and hexene-1. The form of polymerization is not particularly limited, and the monomer may be polymerized into a random copolymer, a block copolymer, or the like.

For example, the crystalline propylene-ethylene block copolymer can be obtained by preparing a crystalline propylene homopolymer portion in a first polymerization step, and copolymerizing propylene, ethylene, and when necessary another α-olefin used in combination with the crystalline propylene homopolymer portion in a second polymerization step or after that. Furthermore, the component (a) may be a mixture of a crystalline propylene homopolymer and a crystalline propylene-ethylene block copolymer.

The method of producing the component (a) is not particularly limited, and a known method can be used. For example, as a catalyst, a titanium trichloride catalyst or a halogenated titanium catalyst in which titanium is carried on a carrier such as magnesium chloride can be used. Examples of the method may include a method in which in the presence of these catalysts and an alkylaluminum compound, propylene or another monomer is polymerized at a polymerization temperature in the range of 0 to 100° C. and a polymerization pressure in the range of 3 to 100 atmospheres. At this time, to adjust the molecular weight of the polymer, a chain transfer agent such as hydrogen may be added. The operation method for polymerization may be selected from a batch method and a continuous method. As the polymerization method, methods such as solution polymerization or slurry polymerization under a solvent such as butane, pentane, hexane, heptane, and octane can be selected. Furthermore, a method such as a bulk polymerization under no solvent in a monomer and gaseous phase polymerization in a gaseous monomer can also be selected.

Besides the polymerization catalysts above, to enhance the isotacticity and polymerization activity of polypropylene, an electron-donating compound as a third component can be used as an internal donor component or external donor component. As these electron-donating compounds, known compounds can be used. Examples of the compounds may include ester compounds such as ε-caprolactone, methyl methacrylate, ethyl benzoate, and methyl toluate; phosphorous acid esters such as triphenyl phosphite and tributyl phosphite; phosphoric acid derivatives such as hexamethylphosphoric triamide; alkoxy ester compounds; aromatic monocarboxylic acid esters; alkoxysilanes such as aromatic alkyl alkoxysilane and aliphatic hydrocarbon alkoxysilane; a variety of ethers, a variety of alcohols; and a variety of phenols.

The component (a) may be a modified product prepared by modifying a non-modified polypropylene resin with a modifier such as an α,β-unsaturated carboxylic acid or a derivative thereof (including acid anhydrides and esters thereof). In this case, examples of the modified product may include those prepared by grafting or adding the non-modified polypropylene resin with an α,β-unsaturated carboxylic acid or a derivative thereof. Specific examples thereof may include those in which an α,β-unsaturated carboxylic acid or a derivative thereof is grafted onto or added to a polypropylene resin in a proportion of approximately 0.01 to 10% by mass of the entire polypropylene resin. The modified polypropylene resin is obtained, for example, by reacting the non-modified polypropylene resin with a modifier in a melting, solution, or slurry state at a temperature in the range of 30 to 350° C. in the presence of or in the absence of a radical generator. In the present embodiment, a mixture of the non-modified polypropylene resin and the modified polypropylene resin in any proportion may be used.

In the component (a), the proportion of the component having a molecular weight of 30,000 or less is from 3.0 to 5.1%, preferably from 4.0 to 5.1%, and more preferably from 4.1 to 4.8% of the entire component (a). At a proportion of the component having a molecular weight of 30,000 or less in the range above, a resin composition having a high thermal aging property while keeping high molding fluidity can be attained.

In the component (a), the proportion of the component having a molecular weight of 10,000,000 or more is from 1.0 to 1.6%, and preferably from 1.2 to 1.5% of the entire component (a). In the resin composition according to the present embodiment, it is presumed that the polymer region in the component (a) particularly contributes to the creep property. For this reason, at a proportion of the component having a molecular weight of 10,000,000 or more in the range above, a resin composition having high molding stability while keeping high thermal creep resistance can be attained.

The proportion of the component having a molecular weight of 30,000 or less and that of the component having a molecular weight of 10,000,000 or more can be determined by extracting the component (a) from the resin composition, and measuring by gel permeation chromatography (GPC). Hereinafter, the measurement will be described.

(Method of Extracting Component (a) and Extraction Condition)

5 g of a pellet of the resin composition is placed in a filter. The filter is placed in boiling xylene (made by Wako Pure Chemical Industries, Ltd.), and the component (a) in the resin composition is dissolved in xylene. The temperature of the xylene in which the component (a) is dissolved is lowered to room temperature to deposit the component (a). The deposited component (a) is filtered out, and vacuum dried at 120° C. to extract the component (a) from the resin composition.

By measuring the extracted component (a) by GPC, the proportion of the component having a molecular weight of 30,000 or less and proportion of the component having a molecular weight of 10,000,000 or more in the component (a) can be determined. Styrene resins having known weight average molecular weights in the monodisperse state and having different molecular weights (weight average molecular weight: 500 to 20,600,000) can be used as standard samples for a calibration curve.

Figure 2:
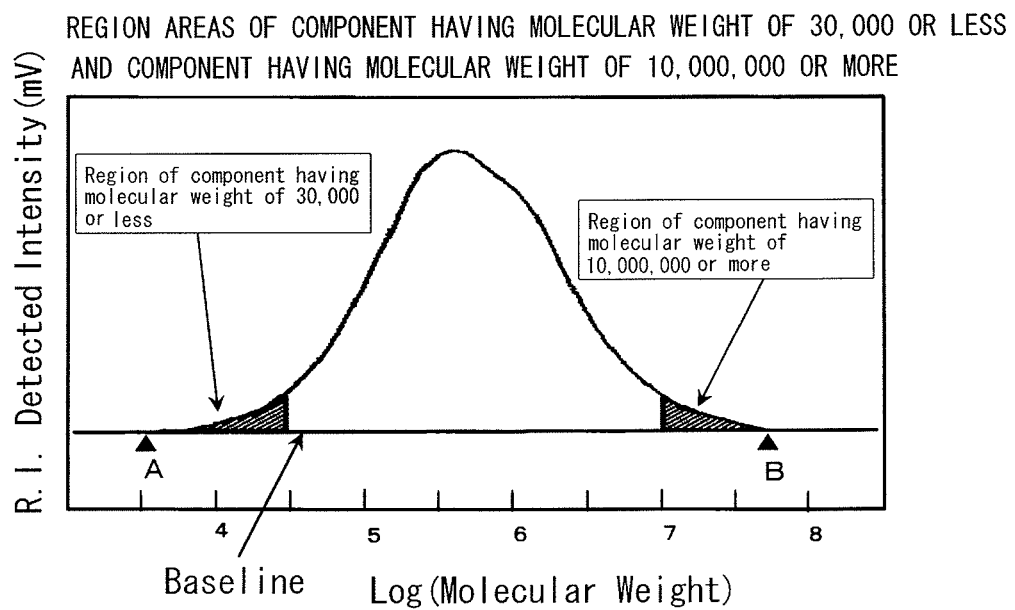
FIG. 2 is a conceptual diagram for describing the region areas of a component having a molecular weight of 30,000 or less and a component having a molecular weight of 10,000,000 or more in the GPC elution curve.

Here, the method of determining the proportion of the component having a molecular weight of 30,000 or less and the proportion of the component having a molecular weight of 10,000,000 or more in the component (a) will be described with reference to the drawings. FIG. 1 is a conceptual diagram for describing a region area in the GPC elution curve. FIG. 2 is a conceptual diagram for describing region areas of the component having a molecular weight of 30,000 or less and the component having a molecular weight of 10,000,000 or more in the GPC elution curve.

First, the region area of the component (a) in the GPC elution curve is determined. The region area here designates an area of a region expressed with oblique lines in FIG. 1. Specifically, the region area is determined as follows. A GPC elution curve is plotted in which the abscissa designates an elution time obtained by the measurement by GPC and the ordinate designates an intensity detected with an RI (differential refractive index detector) (RI detected intensity). Then, a point of intersection A (low molecular region) and point of intersection B (high molecular region) of the GPC elution curve and the baseline are determined.

Then, a portion expressed with oblique lines and surrounded by the GPC elution curve and the baseline between the point of intersection A and the point of intersection B is defined as the region area in the GPC elution curve (see the region expressed with oblique lines in FIG. 1). The region area is defined as the region area of the component (a) in the GPC elution curve. If the molecular weight at the point of intersection A is less than 1,000, the region area is calculated excluding the region area in which the molecular weight is less than 1,000. Specifically, an area obtained by excluding a region area in the GPC elution curve corresponding to the component having a molecular weight of 1,000 or less from the portion expressed with oblique lines and surrounded by the GPC elution curve and the baseline between the point of intersection A and the point of intersection B is defined as the region area of the component (a) in the GPC elution curve.

When a column in which a high molecular weight component elutes first is used, a high molecular weight component is observed in the initial elution time (side of the point of intersection B) and a low molecular weight component is observed in the final elution time (side of the point of intersection A).

Among the region areas thus determined, using the ratio of the region area in the GPC elution curve corresponding to the component having a molecular weight of 30,000 or less to the entire region area of the component (a) in the GPC elution curve, the proportion of the component having a molecular weight of 30,000 or less can be determined. When the molecular weight at the point of intersection A is less than 1,000, as in the case of the region area of the component (a) in the GPC elution curve described above, the region area in the GPC elution curve corresponding to the component having a molecular weight of 30,000 or less is defined as an area excluding the region area in the GPC elution curve corresponding to the component having a molecular weight of 1,000 or less.

In the same manner as above, the region area in the GPC elution curve corresponding to the component having a molecular weight of 10,000,000 or more is determined, and the proportion of the component having a molecular weight of 10,000,000 or more can also be determined from the ratio of the region area to the region area of the component (a) in the GPC elution curve.

FIG. 2 is a diagram showing one example of the region area of the component having a molecular weight of 30,000 or less and the region area of the component having a molecular weight of 10,000,000 or more in the GPC elution curve.

In the component (a), the proportion of the component having a molecular weight of 30,000 or less and the proportion of the component having a molecular weight of 10,000,000 or more can be controlled, for example, by mixing a polypropylene resin having a high molecular weight with a polypropylene resin having a low molecular weight in production of the component (a). Furthermore, by adopting the production method described later, the molecular weight properties of the component (a) can be controlled with higher precision.

The molecular weight distribution of the component (a) (weight average molecular weight (Mw)/number average molecular weight (Mn)) is preferably from 8 to 11, more preferably 8 to 10, still more preferably from 8.5 to 10, and further still more preferably from 8.5 to 9.5. At a molecular weight distribution of the component (a) in the range above, the balance between molding fluidity and thermal creep resistance is further improved, and the balance among physical properties such as the thermal aging property, molding stability in mass production, and flow marks is further reduced. Although details of the mechanism to reduce flow marks are not clarified, it is presumed that by controlling the molecular weight distribution of the component (a) to fall within the range above, the rate of solidifying the resin composition in a metal mold during molding such as injection molding becomes more uniform (but the effect of the mechanism of the present embodiment is not limited to this). The molecular weight distribution is determined from the weight average molecular weight (Mw) and number average molecular weight (Mn) measured by GPC.

The component (a) is preferably a mixture containing a polypropylene resin having a high molecular weight and a polypropylene resin having a low molecular weight. Specifically, a polypropylene resin (a) preferably contains a polypropylene resin having a high molecular weight (a-1) which has a melt flow rate (230° C., load: 2.16 kg) of 0.1 to 1 g/10 min and a polypropylene resin having low molecular weight (a-2) which has a melt flow rate (230° C., load: 2.16 kg) of 4 to 9 g/10 min. Use of a combination of such polypropylene resins having different rheological properties as the component (a) tends to further improve the balance between molding fluidity and thermal creep resistance. The melt flow rate of the component (a) can be measured in accordance with ISO 1133.

The weight ratio ((a-1)/(a-2)) of the component (a-1) to the component (a-2) is preferably from 75/25 to 90/10, more preferably from 76/24 to 90/10, and still more preferably from 77/23 to 90/10.

When a filler is used as a component (d) described later, the weight ratio ((a-1)/(a-2)) of the component (a-1) to the component (a-2) is preferably from 65/35 to 90/10, more preferably from 70/30 to 90/10, still more preferably from 75/25 to 90/10, and further still more preferably from 80/20 to 90/10. When a filler is used as the component (d), the numeric value range above can attain a higher effect of the present embodiment.

The melting point of the component (a) is preferably 163° C. or more, more preferably 165° C. or more, and still more preferably 167° C. or more. A melting point of the component (a) in the numeric value range above can further improve rigidity and reduce flow marks after a thermal history.

The melting point of the component (a) can be determined by measuring the component (a) with a differential scanning calorimeter (DSC) (made by PerkinElmer, Inc., trade name "Type DSC-2") on the condition of the temperature raising rate of 20° C./min and the temperature falling rate of 20° C./min. Specifically, first, after approximately 5 mg of a sample is kept at 20° C. for 2 minutes, the temperature is raised to 230° C. at the temperature raising rate of 20° C./min, and then the sample is kept at 230° C. for 2 minutes. Then, the temperature is lowered to 20° C. at the temperature falling rate of 20° C./min, and the sample is kept at 20° C. for 2 minutes. In this case, the temperature of the top peak among the endothermic peaks that appear when the temperature is raised at the temperature raising rate of 20° C./min can be determined as the melting point.

When the polypropylene resin (a) is the mixture containing a polypropylene resin having a high molecular weight and a polypropylene resin having a low molecular weight described above, a suitable method of producing the resin composition is a method of producing a resin composition described later.
<Component (b)>

The polyphenylene ether resin (b) will be specifically described.

The polyphenylene ether resin (b) (hereinafter also abbreviated to "PPE") is preferably a homopolymer and/or copolymer having a repeating unit structure represented by the following formula (1); or a modified product thereof:

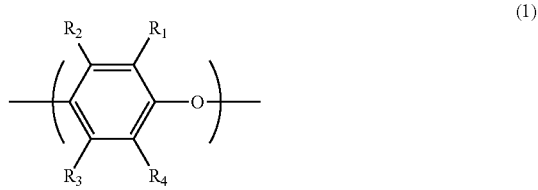

(1)

wherein $R_1$, $R_2$, $R_3$, and $R_4$ each independently represent a hydrogen atom, a halogen atom, a primary or secondary alkyl group having 1 to 7 carbon atoms, a phenyl group, a haloalkyl group, an aminoalkyl group, a hydrocarbon oxy group, or a halohydrocarbon oxy group in which a halogen atom is separated from an oxygen atom by at least two carbon atoms.

The reduced viscosity of the component (b) (0.5 dL/g chloroform solution, measured at 30° C.) is not particularly limited, but is preferably from 0.15 to 0.7 dL/g, and more preferably from 0.2 to 0.6 dL/g. The reduced viscosity can be measured in accordance with the method in Examples described later.

The reduced viscosity of the component (b) (0.5 g/dL chloroform solution, measured at 30° C.) is not particularly limited, but is preferably from 0.15 to 0.7 g/dL, and more preferably from 0.2 to 0.6 g/dL. The reduced viscosity can be measured in accordance with the method in Examples described later.

The component (b) is not particularly limited, and a known resin may be used. Examples of the component (b) may include poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether). Furthermore, examples thereof may include polyphenylene ether copolymers of 2,6-dimethylphenol and other phenols (such as 2,3,6-trimethylphenol and 2-methyl-6-butylphenol).

Among these, preferable specific examples are poly(2,6-dimethyl-1,4-phenylene ether) and a copolymer of 2,6-dimethylphenol and 2,3,6-trimethylphenol, and more preferably poly(2,6-dimethyl-1,4-phenylene ether).

The method of producing the component (b) is not particularly limited, and a conventionally known method can be used. Examples of the method may include a method described in U.S. Pat. No. 3,306,874 in which a complex of a cuprous salt and amine is used as a catalyst, and for example, 2,6-xylenol is oxidation polymerized. Alternatively, the component (b) can be produced by the methods described in U.S. Pat. Nos. 3,306,875, 3,257,357, and 3257358, Japanese Patent Publication No. 52-17880, Japanese Patent Laid-Open Publication Nos. 50-51197 and 63-152628, and the like.

Furthermore, the component (b) may be a modified product prepared by modifying the non-modified polyphenylene ether resin with a modifier such as a styrene-based monomer or a derivative thereof. In this case, examples of the modified product may include those prepared by grafting or adding the non-modified polyphenylene ether resin with a styrene-based monomer or a derivative thereof. The modified polyphenylene ether resin is obtained, for example, by reacting the polyphenylene ether resin with the styrene-based monomer or a derivative thereof in the melting, solution, or slurry state at 80 to 350° C. in the presence of or in the absence of a radical generator.

Examples of the modifier for the polyphenylene ether resin may include styrene-based monomers, α,β-unsaturated carboxylic acids, and derivatives thereof (such as ester compounds and acid anhydride compounds).

Examples of the styrene-based monomer may include styrene, α-methylstyrene, and styrenesulfonic acid.

Specific examples of the modified polyphenylene ether resin may include modified polyphenylene ether resins in which a styrene-based monomer or a derivative thereof is grafted or added in a proportion of 0.01 to 10% by mass.

The component (b) may use a non-modified polyphenylene ether in combination with a modified polyphenylene ether resin. The mixing proportion of the non-modified polyphenylene ether resin to the modified polyphenylene ether resin is not particularly limited, and these resins can be mixed in any proportion.

Furthermore, as the resin composition according to the present embodiment, a mixture in which one or more selected from the group consisting of polystyrenes, syndiotactic polystyrenes, and high impact polystyrenes is mixed with a polyphenylene ether resin can be suitably used. Particularly, the content of total of one or more selected from the group consisting of polystyrenes, syndiotactic polystyrenes, and high impact polystyrenes is more preferably 400 parts by mass or less based on 100 parts by mass of the polyphenylene ether resin.

The resin composition according to the present embodiment preferably has a matrix phase containing the component (a) and a dispersed phase containing the component (b). Thereby, the resin composition can further exhibit thermal creep resistance. Such a morphology can be found with a transmission electron microscope.

The matrix phase may be composed of the component (a) only. The dispersed phase may be composed of the component (b) only, or may be composed of the component (b) and a component (c), for example. In this case, the resin composition has the matrix phase (component (a)) and a dispersed particle that forms the dispersed phase (component (b) only, or the component (b) and the component (c), for example). Most of the component (c) is included in the dispersed phase, and additionally the component (c) may be partially included in the matrix phase in an extent in which the effect of the present embodiment is not impaired. If the resin composition according to the present embodiment has such a morphology, it is presumed that the component (b) contained in the dispersed phase can be dispersed in a more thermally stable manner, thereby further improving the effect of the present embodiment (but the mechanism of the present embodiment is not limited to this).

<Component (c)>

To improve miscibility of the component (a) with the component (b), the resin composition according to the present embodiment further comprises the compatibilizer (c). The component (c) is preferably a copolymer having a segment chain highly miscible with the component (a) and a segment chain highly miscible with the component (b).

Examples of the segment chain highly miscible with the component (a) may include polystyrene chains and polyphenylene ether chains. Examples of the segment chain highly miscible with the component (b) may include polyolefin chains and molecular chains of ethylene and a-olefin copolymer elastomers.

Preferable specific examples of such copolymers may include any one selected from the group consisting of hydrogenated block copolymers, copolymers having a polystyrene-polyolefin chain, and copolymers having a polyphenylene ether-polyolefin chain. Among these, hydrogenated block copolymers are more preferable from the viewpoint of thermal stability. These may be used singly or in combinations of two or more.

Examples of the hydrogenated block copolymers may include hydrogenated block copolymers prepared by hydrogenating at least part of a block copolymer including a polymer block A1 mainly containing a vinyl aromatic compound and at least one polymer block B1 mainly containing a conjugated diene compound.

Preferable specific examples of the hydrogenated block copolymers are preferably hydrogenated block copolymers prepared by hydrogenating at least part of a block copolymer including a polymer block A mainly containing a vinyl aromatic compound and a polymer block B mainly containing a conjugated diene compound in which the total amount of the amount of 1,2-vinyl bonding and the amount of 3,4-vinyl bonding is from 30 to 90%. The conjugated diene compound in the polymer block B preferably has the total amount of the amount of 1,2-vinyl bonding and the amount of 3,4-vinyl bonding of 30 to 90% from the viewpoint of miscibility with PP.

The polymer block A is preferably a homopolymer block of a vinyl aromatic compound, or a copolymer block of a vinyl aromatic compound and a conjugated diene compound.

The expression "the polymer block A mainly containing the vinyl aromatic compound" means that the polymer block A contains more than 50% by mass of the vinyl aromatic compound. From the viewpoint of molding fluidity, impact resistance, weld, and the appearance, preferably, the polymer block A contains 70% by mass or more of the vinyl aromatic compound.

Examples of the vinyl aromatic compound that forms the polymer block A may include styrene, α-methylstyrene, vinyltoluene, p-tert-butylstyrene, and diphenylethylene. These may be used singly or in combinations of two or more. Among these, styrene is preferable.

The number average molecular weight of the polymer block A is not particularly limited. The lower limit is preferably 15,000 or more. The upper limit is preferably 50,000 or less. At a number average molecular weight of the polymer block A in the range above, the resin composition according to the present embodiment can attain higher thermal creep resistance. The number average molecular weight of the polymer block A can be measured by GPC (mobile phase: chloroform, standard substance: polystyrene).

The polymer block B mainly containing a conjugated diene compound is preferably a homopolymer block of a conjugated diene compound, or a random copolymer block of a conjugated diene compound and a vinyl aromatic compound.

The expression "the polymer block B mainly containing a conjugated diene compound" means that the polymer block B contains more than 50% by mass of the conjugated diene compound. From the viewpoint of molding fluidity, impact resistance, weld, and the appearance, the polymer block B preferably contains 70% by mass or more of the conjugated diene compound.

Examples of the conjugated diene compound that forms the polymer block B may include butadiene, isoprene, 1,3-pentadiene, and 2,3-dimethyl-1,3-butadiene. These may be used singly or in combinations of two or more. Among these, butadiene, isoprene, and a combination thereof are preferable.

For the microstructure of the polymer block B (bonding form of the conjugated diene compound), the total amount of the amount of 1,2-vinyl bonding and the amount of 3,4-vinyl bonding (hereinafter sometimes referred to as "the total amount of vinyl bonding") to the total amount of the amount of vinyl bonding contained in the conjugated diene compound that forms the polymer block is preferably from 30 to 90%, more preferably from 45 to 90%, and still more preferably from 65 to 90%. If the total amount of vinyl bonding in the conjugated diene compound in the polymer block B is in the range above, the miscibility with PP is further enhanced. Particularly, when the polymer block B is a polymer block mainly containing butadiene, the total amount of vinyl bonding of butadiene in the polymer block B is preferably from 65 to 90%.

At a total amount of vinyl bonding of 30% or more, the component (b) in the resin composition can have higher dispersibility. At a total amount of vinyl bonding of 90% or less, the resin composition is economically excellent while the component (b) keeps high dispersibility.

The total amount of vinyl bonding can be measured with an infrared spectrophotometer. The calculation method is a method in accordance with Analytical Chemistry, Volume 21, No. 8, August 1949.

The component (c) is preferably a hydrogenated block copolymer of a block copolymer including at least the polymer block A and at least the polymer block B.

When the block polymer A is expressed as "A" and the block polymer B is expressed as "B," examples of the component (c) may include hydrogenated products of vinyl aromatic compound-conjugated diene compound block copolymers having a structure such as A-B, A-B-A, B-A-B-A, (A-B—)$_4$Si, and A-B-A-B-A. (A-B—)$_4$Si represents a reaction residue of a polyfunctional coupling agent such as silicon tetrachloride and tin tetrachloride, a residue of an initiator such as polyfunctional organic lithium compounds, or the like.

The molecule structure of the block copolymer including the block polymer A and the block polymer B is not particularly limited. The molecule structure may be linear, branched, radial, and any combination thereof, for example.

The vinyl aromatic compound in the molecular chains of the polymer block A and the conjugated diene compound in the molecular chains of the polymer block B may be distributed in any form of a random form, a tapered form (in which the monomer component increases or decreases along the molecular chain), a partial block form, and any combination thereof.

When two or more polymer blocks A or two or more polymer blocks B are included in the repeating unit, the two or more polymer blocks may have the same structure or different structures.

From the viewpoint of molding fluidity, impact resistance, weld, and the appearance, the hydrogenated block copolymer as the component (c) contains preferably from 20 to 95% by mass, and more preferably from 30 to 80% by mass of a vinyl aromatic compound to which a block copolymer before hydrogenation is bonded. The content of the vinyl aromatic compound can be measured with an ultraviolet light spectrophotometer.

The number average molecular weight of the block copolymer before hydrogenation is preferably from 5,000 to 1,000,000, more preferably from 10,000 to 800,000, and still more preferably from 30,000 to 500,000. The number average molecular weight can be measured by gel permeation chromatography (GPC, mobile phase: chloroform, standard substance: polystyrene).

The molecular weight distribution of the block copolymer before hydrogenation is preferably 10 or less. The molecular weight distribution can be calculated by determining the ratio (Mw/Mn) of the weight average molecular weight (Mw) to the number average molecular weight (Mn) in which Mw and Mn are measured by GPC (GPC, mobile phase: chloroform, standard substance: polystyrene).

The hydrogenation rate of the conjugated diene compound in the component (c) is not particularly limited. From the viewpoint of heat resistance, preferably 50% or more, more preferably 80% or more, and still preferably 90% or more of the double bond derived from the conjugated diene compound is hydrogenated. The hydrogenation rate can be measured by NMR.

The method of producing a hydrogenated block copolymer in the component (c) is not particularly limited, and a known production method may be adopted. Examples of the known production method may include production methods described in Japanese Patent Laid-Open Publication Nos. 47-011486, 49-066743, 50-075651, 54-126255, 56-010542, 56-062847, 56-100840, and 02-300218, British Patent No. 1130770, U.S. Pat. Nos. 3,281,383 and 3,639,517, British Patent No. 1020720, and U.S. Pat. Nos. 3,333,024 and 4,501,857.

The hydrogenated block copolymer as the component (c) may be a modified hydrogenated block copolymer prepared by grafting or adding the hydrogenated block copolymer with an α,β-unsaturated carboxylic acid or a derivative thereof (ester compounds or acid anhydride compounds thereof).

The modified hydrogenated block copolymer is obtained by reacting the hydrogenated block copolymer with the α,β-unsaturated carboxylic acid or a derivative thereof in a melting, solution, or slurry state at a temperature in the range of 80 to 350° C. in the presence of or in the absence of a radical generator. In this case, the α,β-unsaturated carboxylic acid or a derivative thereof is preferably grafted onto or added to the hydrogenated block copolymer in the proportion of 0.01 to 10% by mass. Furthermore, a mixture of the hydrogenated block copolymer and the modified hydrogenated block copolymer in any proportion may be used.

<Component (d)>

The component and shape or the like of the filler as the component (d) are not particularly limited. Examples of the filler may include inorganic fillers, inorganic reinforcing materials, and organic reinforcing materials. Examples of the shape of the filler may include a fiber shape, a flake-like shape, a whisker-like shape, a plate-like shape, a block-like shape, a bead-like shape, and a balloon-like shape.

Specific examples of the filler (d) may include metal elements in Group I to Group VIII of the periodic table (such as Fe, Na, K, Cu, Mg, Ca, Zn, Ba, Al, and Ti); a single silicon element, oxides, hydroxides, carbon salts, sulfuric acid salts, silicic acid salts, sulfurous acid salts, a variety of clay minerals composed of these compounds, carbon-based fillers, and organic fibers. Specifically, examples of the filler (d) may include barium sulfate, calcium sulfate, magnesium sulfate, sodium sulfate, calcium sulfite, zinc oxide, silica, calcium carbonate, aluminum borate, alumina, iron oxide, calcium titanate, potassium titanate, titanium oxide, aluminum hydroxide, magnesium hydroxide, calcium hydroxide, magnesium carbonate, calcium silicate, clay wollastonite, mica, talc, glass beads, glass fibers, glass flakes, glass powders, quartz sand, silica stone, quartz powder, diatomite, white carbon, carbon black, conductive carbon black, carbon fibers, conductive metal fibers, polyacrylonitrile fibers, and aramid fibers. For the component (d), these may be used singly or in combinations of two or more.

Particularly when the resin composition needs to have a good appearance, the component (d) preferably contains talc.

The average particle diameter of talc is preferably from 1 to 30 μm, more preferably from 2 to 25 μm, and still more preferably from 3 to 20 μm. Here the average particle diameter designates the volume-based particle diameter measured with a particle diameter distribution analyzer. Examples of a dispersion solvent used for measurement of the average particle diameter may include ethanol. These fillers may be used without being treated. To enhance the affinity with another component such as a resin or an interface bonding force, these fillers may be treated using a known inorganic surface treatment agent (such as higher fatty acids and derivatives thereof such as esters and salts thereof, coupling agents, and titanium coupling agents).

The content of the component (d) based on 100 parts by mass in total of the component (a) and the component (b) is preferably from 5 to 50 parts by mass, more preferably from 15 to 40 parts by mass, and still more preferably from 15 to 35 parts by mass. At a content of the component (d) in the range above, the balance among MFR, molding fluidity, and impact resistance can be further improved. Especially when the component (d) is talc, the content in the numeric value range above enhances the effect more significantly.

The resin composition according to the present embodiment may contain known additives in any proportion according to the purpose within a range which does not impair the effect of the present embodiment. Examples of additives may include a plasticizer, a lubricant (such as higher fatty acids and metal salts thereof, and higher fatty acid amides), a heat stabilizer, an antioxidant (such as phenol-based antioxidants, phosphite-based antioxidants, thiodibropropionic acid ester type thioethers), a weather proofing agent (such as benzotriazole-based weather proofing agents, benzophenone-based weather proofing agents, salicylate-based weather proofing agents, cyano acrylate-based weather proofing agents, oxalic acid derivatives, and hindered amine-based weather proofing agents), a nucleator for a polyolefin resin (such as organic-based nucleators such as metal salts of aromatic carboxylic acids, sorbitol-based derivatives, organic phosphoric acid salts, and aromatic amide compounds, and inorganic-based nucleators), a metal deactivator, a flame retardant (such as phosphorus-based flame retardants such as organic phosphoric acid ester-based compounds, ammonium polyphosphate-based compounds, melamine polyphosphate-based compounds, phosphinic acid salts, magnesium hydroxide, aromatic halogen-based flame retardants, silicone-based flame retardants, fluorinated-based polymers, organic phosphorus compounds, red phosphorus, and inorganic-based phosphoric acid salts, halogen flame retardants, and silica flame retardants), flame retardant aids (such as antimony trioxide and antimony pentoxide), an antistatic agent (such as polyamide elastomers, quaternary ammonium salt-based antistatic agents, pyridine derivatives, aliphatic sulfonic acid salts, aromatic sulfonic acid salts, aromatic sulfonic acid salt copolymers, sulfuric acid ester salts, polyhydric alcohol partial esters, alkyldiethanolamines, alkyldiethanolamides, polyalkylene glycol derivatives, betaine-based antistatic agents, and imidazoline derivatives), an antibacterial agent, a fungicide, a sliding property improver (such as hydrocarbon-based sliding property improvers such as low molecular weight polyethylenes, higher alcohols, polyhydric alcohols, polyglycols, polyglycerols, higher fatty acids, higher fatty acid metal salts, fatty acid amides, esters of fatty acids and aliphatic alcohols, full esters or partial esters of fatty acids and polyhydric alcohols, full esters or partial esters of fatty acids and polyglycols, silicone-based sliding property improvers, and fluorinated resin-based sliding property improvers); and inorganic or organic fillers and reinforcing materials (such as polyacrylonitrile fibers and conductive metal fibers).

To give designability, a known colorant (such as inorganic pigments, organic-based pigments, metallic pigments, and dyes) can be added to the resin composition.

A second aspect of the resin composition according to the present embodiment is a resin composition, comprising 100 parts by mass in total of a polypropylene resin (a) and a polyphenylene ether resin (b), 1 to 20 parts by mass of a compatibilizer (c), and 5 to 50 parts by mass of a filler (d), wherein in the component (a), a proportion of a component having a molecular weight of 30,000 or less, which is determined by gel permeation chromatography (GPC, mobile phase: o-dichlorobenzene, standard substance: polystyrene), is from 1.0 to 5.1% of the component (a), and a proportion of a component having a molecular weight of 10,000,000 or more is from 0.5 to 1.6% of the entire component (a). The resin composition according to the second aspect is a resin composition having higher molding fluidity and reduced flow marks while keeping rigidity and impact resistance. Hereinafter, unless otherwise specified, the component (a), the component (b), the component (c), the component (d), and other components described in the first aspect can be used.

Examples of preferable forms of the resin composition according to the second aspect may include the followings.

(1) Preferably, 5 to 50 parts by mass of the filler (d) is further contained based on 100 parts by mass in total of the component (a) and the component (b).

(2) Preferably, the component (c) is a hydrogenated block copolymer prepared by hydrogenating at least part of a block copolymer including a polymer block A mainly containing a vinyl aromatic compound and a polymer block B mainly containing a conjugated diene compound in which the total amount of the amount of 1,2-vinyl bonding and the amount of 3,4-vinyl bonding is from 30 to 90% based on the total amount of the amount of vinyl bonding contained in the conjugated diene compound that forms the polymer block.

(3) Preferably, in the polymer block B, the total amount of the amount of 1,2-vinyl bonding and the amount of 3,4-vinyl bonding is from 65 to 90% based on the total amount of the amount of vinyl bonding contained in the conjugated diene compound that forms the polymer block. In this case, the total amount of the amount of 1,2-vinyl bonding and the amount of 3,4-vinyl bonding is more preferably 65 to 85%. Particularly, when the polymer block B is a polymer mainly containing butadiene, the total amount of the amount of 1,2-vinyl bonding and the amount of 3,4-vinyl bonding in the polymer block B is in the range above.

(4) Preferably, the component (d) is talc.

The resin composition according to the second aspect may further contain other components such as the additives described in the resin composition according to the first aspect within a range which does not impair the effect.

<Method of Producing Resin Composition>

A method of producing a resin composition according to the present embodiment will be described. The resin composition according to the present embodiment can be produced using a variety of melt kneaders and kneading extruders, for example.

The melt kneaders and kneading extruders are not particularly limited, and known kneaders can be used. Examples thereof may include heat melt kneaders such as multi screw extruders such as single screw extruders and twin screw extruders, rolls, kneaders, Brabender Plastographs, and Banbury mixers. Among these, a melt kneader using a twin screw extruder is preferable. Specifically, examples thereof may include kneading extruders such as "ZSK" series made by Coperion GmbH, "TEM" series made by TOSHIBA MACHINE CO., LTD., and "TEX" series made by The Japan Steel Works, Ltd.

When the extruder is used, the kind and specification thereof or the like are not particularly limited, and a known extruder can be properly used. For example, the L/D ratio (barrel effective length (L)/barrel inner diameter (D)) of the extruder is, usually, preferably 20 to 75, and more preferably 30 to 60.

The extruder preferably may include a first raw material feeding port provided upstream of the raw material flow direction, a first vacuum vent provided downstream of the first raw material feeding port, a second raw material feeding port provided downstream of the first vacuum vent, and a second vacuum vent provided downstream of the second raw material feeding port, for example. The extruder may further include a third raw material feeding port and a third vacuum vent or the like provided downstream of them. The total number of raw material feeding ports and arrangement thereof in the extruder can be properly set in consideration of the number of the kinds of resin composition materials, for example.

A method of feeding a raw material to the second raw material feeding port is not particularly limited. For higher stability, a method of adding and feeding a raw material from an extruder side opening using a forcible side feeder is preferable to simply adding and feeding a raw material from the openings of the second and third raw material feeding ports in the extruder.

The melt kneading temperature and the number of screw rotation are not particularly limited. Usually, preferably, the melt kneading temperature is from 200 to 370° C. and the number of screw rotation is from 100 to 1200 rpm.

As described above, in the resin composition according to the present embodiment, the component (a) is preferably a mixture of the high molecular weight polypropylene resin and the low molecular weight polypropylene resin. Particularly, a mixture including the high molecular weight polypropylene resin (a-1) having a melt flow rate of 0.1 to 1 g/10 min and the low molecular weight polypropylene resin (a-2) having a melt flow rate of 4 to 9 g/10 min is preferable. The weight ratio ((a-1)/(a-2)) of the component (a-1) to the component (a-2) is preferably from 75/25 to 90/10, and more preferably from 77.5/22.5 to 90/10, as described above.

When the component (a) is a mixture including two or more components described above, the resin composition is preferably produced by production method 1 or production method 2 below.

Production Method 1: a Method of Producing a Resin Composition, Comprising the Following Steps (1-1) and (1-2), step (1-1): a step of melt kneading the component (a-2), the component (b), and the component (c) to obtain a kneaded product, and step (1-2): a step of adding the component (a-1) to the kneaded product obtained in step (1-1), and performing melt kneading.

Production Method 2: a Method of a Producing Resin Composition, Comprising the Following Steps (2-1) and (2-2), step (2-1): a step of melt kneading part of the component (a-2), the component (b), and the component (c) to obtain a kneaded product, and step (2-2): a step of adding the rest of the component (a-2) and the component (a-1) to the kneaded product obtained in step (2-1), and performing melt kneading.

As these production methods, degradation of the high molecular weight component by heat can be further suppressed by adding the high molecular weight component (such as the component (a-1)), which is effective in improving thermal creep resistance and the thermal aging property, at a later stage during melt kneading. As a result, a resin composition having higher thermal creep resistance and a higher thermal aging property can be obtained. Examples of a method of adding the high molecular weight component at a later stage may include a method of adding the high molecular weight component from a raw material feeding port provided downstream of a melt kneader or a kneading extruder.

Moreover, high molding fluidity can be given by adding the low molecular weight component (such as the component (a-2)), which is effective in improving molding fluidity, at an earlier stage. As a result, a resin composition having a high thermal aging property while keeping high molding fluidity and thermal creep resistance can be obtained efficiently. Examples of a method of adding the low molecular weight component at an earlier stage may include a method of adding the low molecular weight component from a raw material feeding port provided upstream of a melt kneader or a kneading extruder.

When the component (d) is used, the weight ratio ((a-1)/(a-2)) of the component (a-1) to the component (a-2) is preferably from 65/35 to 90/10, more preferably from 70/30 to 90/10, still more preferably from 75/25 to 90/10, and further still more preferably from 80/20 to 90/10. When a filler is used as the component (d), the weight ratio of the component (a-1) to the component (a-2) in the numeric value range above can attain a higher effect of the present embodiment. When the component (a) is a mixture including the component (a-1) and the component (a-2) above, the method of producing a resin composition according to the present embodiment is preferably production method 3 or production method 4 below.

Production Method 3: a Method of Producing a Resin Composition, Comprising the Following Steps (3-1), (3-2), and (3-3), step (3-1): a step of melt kneading the whole of the component (a-2), the whole of the component (b), and part or the whole of the component (c) to obtain a kneaded product, step (3-2): a step of adding the whole of the component (a-1), part or the whole of the component (d), and the rest of the component (c) (excluding when the whole of the component (c) is used in step (3-1)) to the kneaded product obtained in step (3-1), and performing melt kneading to obtain a kneaded product; and step (3-3): a step of adding the rest of the component (d) (excluding when the whole of the component (d) is used in step (3-2)) to the kneaded product obtained in step (3-2), and performing melt kneading.

Production Method 4: a Method of Producing a Resin Composition, Comprising the Following Steps (4-1), (4-2), and (4-3), step (4-1): a step of melt kneading part of the component (a-2), the whole of the component (b), and part or the whole of the component (c) (excluding when the whole of the component (c) is used in step (4-1)) to obtain a kneaded product, step (4-2): a step of adding the rest of the component (a-2), the rest of the component (c), the whole of the component (a-1), and part or the whole of the component (d) to the kneaded product obtained in step (4-1), and performing melt kneading to obtain a kneaded product, and step (4-3): a step of adding the rest of the component (d) (excluding when the whole of the component (d) is used in step (4-2)) to the kneaded product obtained in step (4-2), and performing melt kneading.

As these production methods, degradation of the high molecular weight component by heat can be further suppressed by adding the high molecular weight component, which is effective in improving rigidity and impact resistance and reducing flow marks, at a later stage during melt kneading. As a result, a resin composition having higher rigidity and impact resistance and reduced flow marks can be obtained. Examples of a method of adding the high molecular weight component at a later stage may include a method of adding the high molecular weight component from a raw material feeding port provided downstream of a melt kneader or a kneading extruder.

Moreover, higher molding fluidity can be given by adding the low molecular weight component, which is effective in improving molding fluidity, at an earlier stage. As a result, a resin composition having higher molding fluidity and reduced flow marks while keeping rigidity and impact resistance can be obtained efficiently. Examples of a method of adding the low molecular weight component at an earlier stage may include a method of adding the low molecular weight component from a raw material feeding port provided upstream of a melt kneader or a kneading extruder.

A molded article according to the present embodiment comprises the resin composition above. The molded article according to the present embodiment can be obtained, for example, by molding the resin composition. The molded article according to the present embodiment can be used as various members, for example. Particularly, the molded article according to the present embodiment can be suitably used as a member for secondary battery containers (including sealed type secondary battery containers).

A molding method is not particularly limited. Examples of the molding methods may include molding methods such as injection molding, hollow molding, extrusion, sheet molding, film molding, thermoforming, rotational molding, and lamination molding. The molded article to be finally obtained is a sheet, a film, or an injection molded article in another form, for example, and can be used as a member for secondary battery containers having a structure in which the electrodes and the electrolyte are directly wrapped.

EXAMPLES

Hereinafter, the embodiment according to the present invention will be described with reference to Examples, but the present invention will not be limited to these Examples Examples 1 to 11, Comparative Examples 1 to 6

The raw materials used in Examples 1 to 11 and Comparative Examples 1 to 6 are as follows.
Polypropylene Resin (a)
(a-1) A polypropylene having a melt flow rate (230° C., load: 2.16 kg)=0.4 g/10 min, molecular weight distribution (Mw/Mn)=7.7, a melting point: 167° C., and a density: 0.90 g/cm$^3$.
(a-2) A polypropylene having a melt flow rate (230° C., load: 2.16 kg)=5.9 g/10 min, molecular weight distribution (Mw/Mn)=12.5, a melting point: 166° C., and a density: 0.90 g/cm$^3$.
(a-3) A polypropylene having a melt flow rate (230° C., load: 2.16 kg)=0.5 g/10 min, molecular weight distribution (Mw/Mn)=13.7, a melting point: 166° C., and a density: 0.90 g/cm$^3$.
The melt flow rate of the polypropylene resin (a) was measured in accordance with ISO 1133.

The molecular weight distribution (Mw/Mn) of the polypropylene resin (a) was determined from the weight average molecular weight (Mw) and number average molecular weight (Mn) which were measured by gel permeation chromatography (GPC). The measurement condition in GPC will be described later.
Polyphenylene Ether Resin (b)
(b-1) A polyphenylene ether obtained by oxidation polymerizing 2,6-xylenol, and having a reduced viscosity (0.5 dL/g chloroform solution, measured at 30° C.)=0.52.
The reduced viscosity was measured using an Ubbelohde viscometer on the condition of a 0.5 dL/g chloroform solution and 30° C.
Compatibilizer (c)
(c-1) A hydrogenated block copolymer having a structure of polystyrene-hydrogenated polybutadiene-polystyrene. The amount of bound styrene was 43%, the amount of 1,2-vinyl bonding in the polybutadiene portion was 75%, the number average molecular weight of the polystyrene chain was 20,000, and the hydrogenation rate of the polybutadiene portion was 99.9%.

The hydrogenated block copolymer was prepared as follows. Using n-butyllithium as an initiator and tetrahydrofuran as an adjuster for the amount of 1,2-vinyl bonding, styrene and butadiene were anion block copolymerized in a cyclohexane solvent to obtain a styrene-butadiene-based block copolymer. Next, using bis(η5-cyclopentadienyl)titanium dichloride and n-butyllithium as hydrogenating catalysts, the obtained styrene-butadiene-based block copolymer was hydrogenated on the condition of a pressure of hydrogen of 5 kg/cm$^2$ and a temperature of 50° C. The polymer structure was controlled by adjusting the amount of the monomer to be charged and the order of charge. The molecular weight was controlled by adjusting the amount of the catalyst. The amount of 1,2-vinyl bonding was controlled by adjusting the amount of the adjuster for the amount of 1,2-vinyl bonding to be added and the polymerization temperature. The hydrogenation rate was controlled by adjusting the hydrogenating time.

The amount of 1,2-vinyl bonding in the polybutadiene portion was measured with an infrared spectrophotometer, and calculated in accordance with the method described in Analytical Chemistry, Volume 21, No. 8, August 1949.

The amount of bound styrene was measured with an ultraviolet light spectrophotometer.

The number average molecular weight of the polystyrene chain was measured by GPC (mobile phase: chloroform, standard substance: polystyrene).

The hydrogenation rate of the polybutadiene portion was measured with a nuclear magnetic resonance apparatus (NMR).

(c-2) trade name "Kraton G1701M Polymer (a copolymer having polystyrene-polyolefin chain; made by Kraton Performance Polymers, Inc.)"
base copolymer: styrene, ethylene/propylene (amount of polypropylene: 37%), melt flow rate (230° C., load: 5 kg)=1 g/10 min Example 1

As an apparatus for prodding a resin composition, a twin screw extruder "TEM58SS" (made by TOSHIBA MACHINE CO., LTD., L/D ratio=53.8) was used. In the twin screw extruder, a first raw material feeding port was provided upstream of the raw material flow direction and a second raw material feeding port was provided downstream thereof. A vacuum vent was provided between these raw material feeding ports and another vacuum vent was provided downstream of the second raw material feeding port. The method of feeding a raw material to the second feeding port was the method of feeding a raw material from an extruder side opening using a forcible side feeder.

The components (a) to (c) in the composition shown in Table 1 were fed to the twin screw extruder set as above, and melt kneaded on the condition of an extruder barrel setting temperature of 270 to 320° C., the number of screw rotation of 650 rpm, and an amount to be ejected of 500 kg/h to obtain a pellet of a resin composition.

Examples 2 to 11

Each of pellets of the resin compositions was obtained in the same manner as in Example 1 except that the components (a) to (c) in the composition shown in Table 1 were fed to the twin screw extruder.

Comparative Examples 1 and 3 to 6

Each of pellets of the resin compositions was obtained in the same manner as in Example 1 except that the components (a) to (c) in the composition shown in Table 2 were fed to the twin screw extruder.

Comparative Example 2

As an apparatus for producing a resin composition, a twin screw extruder "TEM58SS" (made by TOSHIBA MACHINE CO., LTD., L/D ratio=53.8) was used. In the twin screw extruder, a first raw material feeding port was provided upstream of the raw material flow direction and a second raw material feeding port was provided downstream thereof. A vacuum vent was provided between these raw material feeding ports and another vacuum vent was provided downstream of the second feeding port. The method of feeding a raw material to the second feeding port was the method of feeding a raw material from an extruder side opening using a forcible side feeder.

The components (a) to (c) in the composition shown in Table 2 were fed to the extruder set as above, and melt kneaded on the condition of an extruder barrel setting temperature of 300 to 350° C., the number of screw rotation of 665 rpm, and an amount to be ejected of 500 kg/h to obtain a pellet of a resin composition.

The properties or the like of the pellets of the resin compositions obtained in Examples and Comparative Examples were evaluated as follows.

<Melt Flow Rate (MFR)>

In each of the pellets of the resin compositions obtained in Examples and Comparative Examples, the melt flow rate (MFR) was measured in accordance with ISO 1133 on the condition of 250° C. and a load of 10 kg. A melt flow rate of 10 g/10 min or more was determined as acceptable.

<Thermal Creep Resistance>

Each of the pellets of the resin compositions obtained in Examples and Comparative Examples was fed to a screw in-line type injection molding machine in which the temperatures of four cylinders provided from a hopper side to a nozzle side were set at 245° C. The pellet was injection molded on the condition of a metal mold temperature of 60° C. to obtain a test piece for measuring creep. The screw in-line type injection molding machine used is composed of four cylinder blocks from the hopper to the nozzle, and the setting of the temperatures of the cylinder blocks can be controlled. Namely, in this case, the setting temperatures in the four cylinder blocks were all set at 245° C. The obtained test piece for measuring creep was left to stand for 24 hours under an 80° C. environment using a gear oven to undergo a thermal history treatment.

Figure 3:
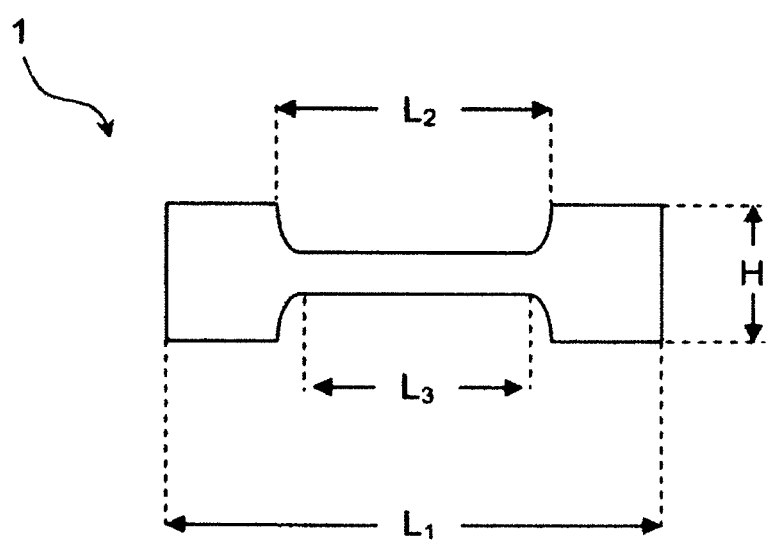
FIG. 3 is a simplified front view showing a test piece used in Examples.

The test piece for measuring creep used was a dumbbell molded article having a shape shown in FIG. 3 (thickness: 1 mm). FIG. 3 is a simplified front view showing the test piece used in Examples. A test piece 1 had a width $L_1$ of 65 mm, a width $L_2$ of 40 mm, a width $L_3$ of 22 mm, and a height H of 10 mm.

Then, the test piece for measuring creep was left to stand for 24 hours in an 80° C. gear oven to undergo a thermal history treatment.

After the thermal history treatment, the test piece for measuring creep was subjected to creep measurement. Using a creep tester (made by YASUDA SEIKI SEISAKUSHO, LTD., "145-B-PC type"), creep measurement (thermal creep resistance test) was performed on the condition of a distance between chucks of 40 mm, a test load equivalent to a stress of 12.25 MPa, a test temperature of 80° C., and a test time of 165 hours. The thermal creep resistance was evaluated by the distortion [%] determined by the following equation. The distortion [%] less than 40% was determined as acceptable.

Distortion[%]=(displacement of test piece after 165 hours)/(distance between chucks)×100

<Thermal Aging Property>

Each of the pellets of the resin compositions obtained in Examples and Comparative Examples was fed to a screw in-line type injection molding machine, and injection molded on the condition of a metal mold temperature of 60° C. to obtain a test piece for measuring tensile strength. The setting temperatures of the four cylinder blocks disposed from the hopper to the nozzle in the screw in-line type injection molding machine were set at 220° C./230° C./245° C./245° C. sequentially from the hopper side toward the nozzle side. The obtained test piece for measuring tensile strength was left to stand for 24 hours under an 80° C. environment using a gear oven to undergo a thermal history treatment.

After the thermal history treatment, the test piece for measuring tensile strength was aged for 2,000 hours under a 120° C. environment using the gear oven.

As the measurement of the thermal aging property, the test piece for measuring tensile strength after the thermal history treatment and after the aging was subjected to a tensile test (ISO 527). The thermal aging property of the resin composition was evaluated by the tensile strength retention rate determined by the following equation. A tensile strength retention rate of 97% or more was determined as acceptable.

Tensile strength retention rate[%]=(tensile strength after aging)/(tensile strength after thermal history treatment)×100

<Molding Stability>

In each of the pellets of the resin compositions obtained in Examples and Comparative Examples, the MFR was measured in accordance with ISO 1133 on the condition (1) of a temperature: 230° C. and a load: 10 kg and on the condition (2) of a temperature of 250° C. and a load: 10 kg. The molding stability of the resin composition was evaluated by the MFR retention rate determined by the following equation. An MFR retention rate of 80% or more was determined as acceptable.

MFR retention rate[%]=MFR value determined on condition(1)/MFR value determined on condition (2)×100

<Measurement of Molecular Weight and Molecular Weight Distribution of Polypropylene Resin Component (a)>

By the following method, the polypropylene resin (a) was extracted from each of the resin compositions obtained in Examples and Comparative Examples.

(Extraction Method, Extraction Condition)

5 g of each of the pellets of the resin compositions obtained in Examples and Comparative Examples was placed in a filter, and the filter was placed in boiling xylene (made by Wako Pure Chemical Industries, Ltd.). The whole of the component (a) in the resin composition was dissolved in xylene. The temperature of the boiling xylene was 150° C., and the heating time was 10 hours. The temperature of the xylene in which the component (a) was dissolved was lowered to room temperature (23° C.) to deposit the component (a). The deposited component (a) was filtered out, and vacuum dried at 120° C. to extract the component (a) from the resin composition.

The molecular weight of the polypropylene resin (a) thus extracted was measured by gel permeation chromatography (GPC).

The condition on the GPC measurement is as follows.
Measurement apparatus: "Alliance GPC2000" (made by Waters Corporation)
Column: "TSKgel GMH6-HT"×2+"TSKgel GMH6-HTL"×2
Detector: RI (differential refractive index) detector
Mobile phase: o-dichlorobenzene (0.025% BHT contained)
Column temperature: 140° C.
Flow rate: 1.0 mL/min
Sample concentration: 0.15% (w/v)-o-dichlorobenzene
Amount to be injected: 0.5 mL The styrene resins having known weight average molecular weights in a monodisperse and different molecular weights (weight average molecular weight: 500 to 20,600,000) were used as standard samples for a calibration curve.

The proportion of the component having a molecular weight of 30,000 or less, and proportion of the component having a molecular weight of 10,000,000 or more in the component (a) were determined by the method above.

The results in Examples 1 to 11 are shown in Table 1, and those in Comparative Examples 1 to 6 are shown in Table 2.

TABLE 1

| | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| First raw material feeding port | a-1 | Parts by mass | | | | | 27 | | | | | | |
| | a-2 | | 9 | 18 | 20 | 22 | 3 | 9 | 16 | 16 | 16 | 16 | 20 |
| | a-3 | | | | | | | | | | | | |
| | b-1 | Parts by mass | 10 | 10 | 10 | 10 | 10 | 10 | 10 | 10 | 10 | 20 | 10 |
| | c-1 | Parts by mass | 3 | 3 | 3 | 3 | 3 | | 3 | 3 | 3 | 5 | 6 |
| | c-2 | | | | | | | 3 | | | | | |
| Second raw material feeding port | a-1 | Parts by mass | 81 | 72 | 70 | 68 | 54 | 81 | 70 | 69 | 68 | 64 | 70 |
| | a-2 | | | | | | 6 | | 4 | 5 | 6 | | |
| | a-3 | | | | | | | | | | | | |
| | b-1 | Parts by mass | | | | | | | | | | | |
| | c-1 | Parts by mass | | | | | | | | | | | |
| | c-2 | | | | | | | | | | | | |
| Physical properties | (a-1)/(a-2) | wt/wt | 90/10 | 80/20 | 78/22 | 76/24 | 90/10 | 90/10 | 78/22 | 77/23 | 76/24 | 80/20 | 78/22 |
| | Proportion of component having molecular weight of 30,000 or less in component (a) | % | 4.2 | 4.5 | 4.5 | 4.9 | 4.3 | 4.2 | 4.6 | 4.8 | 5.0 | 4.7 | 4.5 |
| | Proportion of component having molecular weight of 10,000,000 or more in component (a) | % | 1.5 | 1.2 | 1.2 | 1.0 | 1.1 | 1.4 | 1.3 | 1.2 | 1.1 | 1.1 | 1.1 |
| | Molecular weight distribution (Mw/Mn) of component (a) in resin composition | — | 9.3 | 9.1 | 9.0 | 8.5 | 9.5 | 9.1 | 8.9 | 8.9 | 8.7 | 9.2 | 9.0 |
| | MFR | g/10 min | 10.9 | 14.2 | 17.6 | 18.5 | 13.2 | 10.9 | 17.2 | 17.6 | 18.2 | 12.9 | 18.3 |
| | Thermal creep resistance | % | 16 | 17 | 23 | 39 | 28 | 20 | 22 | 25 | 33 | 27 | 28 |
| | Thermal aging property (tensile strength retention rate) | % | 98.1 | 97.5 | 97.4 | 97.2 | 97.3 | 97.5 | 98.0 | 98.0 | 97.8 | 97.3 | 97.9 |
| | Molding stability (MFR retention rate) | % | 85 | 83 | 83 | 82 | 83 | 82 | 83 | 83 | 82 | 82 | 83 |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| First raw material feeding port | a-1 | Parts by mass | 23 | 27 | | | | |
| | a-2 | | 8 | 3 | | 27 | | 24 |
| | a-3 | | | | 33 | | | |
| | b-1 | Parts by mass | 10 | 10 | 10 | 10 | 10 | 20 |
| | c-1 | Parts by mass | 3 | 3 | 3 | 3 | 3 | 5 |
| | c-2 | | | | | | | |

TABLE 2-continued

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Second raw material feeding port | a-1 | Parts by mass | 45 | 54 |  | 63 | 81 | 56 |
|  | a-2 |  | 15 | 6 |  |  | 9 |  |
|  | a-3 |  |  |  | 67 |  |  |  |
|  | b-1 | Parts by mass |  |  |  |  |  |  |
|  | c-1 | Parts by mass |  |  |  |  |  |  |
|  | c-2 |  |  |  |  |  |  |  |
| Physical properties | (a-1)/(a-2) | wt/wt | 75/25 | 90/10 | — | 70/30 | 90/10 | 70/30 |
|  | Proportion of component having molecular weight of 30,000 or less in component (a) | % | 5.2 | 4.6 | 6.3 | 5.2 | 2.9 | 5.4 |
|  | Proportion of component having molecular weight of 10,000,000 or more in component (a) | % | 0.9 | 0.9 | 1.6 | 0.9 | 1.5 | 0.7 |
|  | Molecular weight distribution (Mw/Mn) of component (a) in resin composition | — | 9.2 | 10.0 | 11.1 | 8.4 | 9.1 | 8.6 |
|  | MFR | g/10 min | 21.4 | 16.3 | 16.5 | 20.3 | 9.7 | 15.1 |
|  | Thermal creep resistance | % | 44 | 42 | 23 | 43 | 15 | 47 |
|  | Thermal aging property (tensile strength retention rate) | % | 96.0 | 96.8 | 95.8 | 96.8 | 98.1 | 96.2 |
|  | Molding stability (MFR retention rate) | % | 82 | 81 | 78 | 80 | 85 | 83 |

The pellets of the resin compositions in Examples 1 to 11 all had an MFR of 10 g/min or more, a thermal creep resistance of less than 40%, a thermal aging property (tensile strength retention rate) of 97% or more, and a molding stability (MFR retention rate) of 80% or more. It was found that the balance between molding fluidity and thermal creep resistance was good and the thermal aging property and molding stability were high. In contrast, it was found that at least one of the molding fluidity, thermal creep resistance, thermal aging property, and molding stability was poor in the resin compositions in Comparative Examples 1 to 6.

Examples 12 to 17, Comparative Examples 7 to 9

Examples 12 to 17 and Comparative Examples 7 to 9 were examined. The raw materials used in Examples 12 to 17 and Comparative Examples 7 to 9 are as follows.

Polypropylene Resin (a)

(a-1-1) A polypropylene having a melt flow rate (230° C., load: 2.16 kg)=0.4/10 min, molecular weight distribution (Mw/Mn)=7.7, a melting point: 167° C., and a density: 0.90 g/cm$^3$.

(a-2-1) A polypropylene having a melt flow rate (230° C., load: 2.16 kg)=5.9 g/10 min, molecular weight distribution (Mw/Mn)=12.5, a melting point: 166° C., and a density: 0.90 g/cm$^3$.

(a-3-1) A polypropylene having a melt flow rate (230° C., load: 2.16 kg)=0.5 g/10 min, molecular weight distribution (Mw/Mn)=13.7, a melting point: 166° C., and a density: 0.90 g/cm$^3$.

(a-4-1) A polypropylene having a melt flow rate (230° C., load: 2.16 kg)=10 g/10 min, molecular weight distribution (Mw/Mn)=11.5, a melting point: 160° C., and a density: 0.90 g/cm$^3$.

The melt flow rate of the polypropylene resin (a) was measured in accordance with ISO 1133.

The molecular weight distribution (Mw/Mn) of the polypropylene resin (a) was determined from the ratio of the weight average molecular weight (Mw) to the number average molecular weight (Mn), which were measured by GPC (mobile phase: o-dichlorobenzene, standard substance: polystyrene).

The melting point of the polypropylene resin (a) was measured with a differential scanning calorimeter (DSC) (made by PerkinElmer, Inc., trade name "DSC-2 type"). Specifically, first, approximately 5 mg of a sample was kept at 20° C. for 2 minutes. Then, after the temperature was raised to 230° C. at a temperature raising rate of 20° C./min, the sample was kept at 230° C. for 2 minutes. Then, after the temperature was lowered to 20° C. at a temperature falling rate of 20° C./min, the sample was further kept at 20° C. for 2 minutes. The melting point was defined as the temperature of the top peak in the endothermic peaks that appeared when the temperature was raised at a temperature raising rate of 20° C./min.

Polyphenylene Ether Resin (b)

A polyphenylene ether obtained by oxidation polymerizing 2,6-xylenol, and having a reduced viscosity (0.5 dL/g chloroform solution, measured at 30° C.)=0.41.

The reduced viscosity was measured using an Ubbelohde viscometer on the condition of a 0.5 dL/g chloroform solution and 30° C.

Compatibilizer (c)

A hydrogenated block copolymer having a structure (B-A-B-A) of hydrogenated polybutadiene-polystyrene-hydrogenated polybutadiene-polystyrene.

The hydrogenated block copolymer in which the amount of bound styrene was 44%, the number average molecular weight of the entire polymer was 95,000, the molecular weight distribution was 1.06, the number average molecular weight of the polystyrene portion (A) was 20900, the amount of 1,2-vinyl bonding in polybutadiene before hydrogenation was 75%, and the hydrogenation rate of the polybutadiene portion was 99.9%.

The hydrogenated block copolymer was prepared as follows. Using n-butyllithium as an initiator and tetrahydrofuran as an adjuster for the amount of 1,2-vinyl bonding, styrene and butadiene were anion block copolymerized in a cyclohexane solvent to obtain a styrene-butadiene-based block copolymer. Next, using bis(η5-cyclopentadienyl)titanium dichloride and n-butyllithium as hydrogenating catalysts, the obtained styrene-butadiene-based block copolymer was hydrogenated on the condition of a pressure of hydrogen of 5 kg/cm$^2$ and a temperature of 50° C. The polymer structure was controlled by adjusting the amount of the monomer to be charged and the order of charge. The molecular weight was controlled by adjusting the amount of the catalyst. The amount of 1,2-vinyl bonding was controlled by adjusting the amount of the adjuster for the amount of 1,2-vinyl bonding to be added and the polymerization temperature. The hydrogenation rate was controlled by adjusting the hydrogenating time.

The amount of 1,2-vinyl bonding in the polybutadiene portion was measured with an infrared spectrophotometer, and calculated in accordance with the method described in Analytical Chemistry, Volume 21, No. 8, August 1949.

The amount of bound styrene was measured with an ultraviolet light spectrophotometer.

The number average molecular weight and the molecular weight distribution were measured by GPC (mobile phase: chloroform, standard substance: polystyrene).

The hydrogenation rate of the polybutadiene portion was measured by NMR.

Filler (d)

Talc (made by Hayashi-Kasei Co., Ltd., trade name "TAL-CAN PAWDER PK-C", average particle diameter: 11 μm). The average particle diameter was measured with a particle diameter distribution analyzer "SA-CP3L" (made by SHI-MADZU Corporation).

Example 12

As an apparatus for producing a resin composition, a twin screw extruder (made by Coperion GmbH, trade name "ZSK25") was used. In the twin screw extruder, a first raw material feeding port was provided upstream of the raw material flow direction and a second raw material feeding port was provided downstream thereof. A vacuum vent was provided between these raw material feeding ports and another vacuum vent was provided downstream of the second feeding port. The method of feeding a raw material to the second feeding port was the method of feeding a raw material from an extruder side opening using a forcible side feeder. The components (a) to (d) in the composition shown in Table 3 were fed to the twin screw extruder set as above, and melt kneaded on the condition of an extruder barrel setting temperature of 270 to 320° C., the number of screw rotation of 300 rpm, and an amount to be ejected of 15 kg/h to obtain a pellet of a resin composition. The physical properties of the obtained resin composition were measured as follows. The measurement results are shown in Table 3.

Examples 13 to 17, Comparative Examples 7 to 9

Each of pellets of the resin compositions was obtained in the same manner as in Example 12 except that the components (a) to (d) in the composition shown in Table 1 were fed to the twin screw extruder. The physical properties of the obtained resin compositions were measured as follows. The measurement results are shown in Table 3.

<Melt Flow Rate (MFR)>

In each of the pellets of the resin compositions obtained in Examples and Comparative Examples, the melt flow rate (MFR) was measured in accordance with ISO 1133 on the condition of 250° C. and a load of 10 kg.

<Rigidity (Flexural Modulus)>

Each of the pellets of the resin compositions obtained in Examples and Comparative Examples was fed to the screw in-line type injection molding machine, and injection molded into a test piece for measuring a flexural modulus on the condition of a metal mold temperature of 60° C. The setting temperatures of the four cylinder blocks disposed from the hopper to the nozzle in the screw in-line type injection molding machine were set at 220° C./230° C./245° C./245° C. sequentially from the hopper side to the nozzle side. Then, the test piece 1 shown in FIG. 3 was produced. The width $L_1$ was 65 mm, the width $L_2$ was 40 mm, the width $L_3$ was 22 mm, and the height H was 10 mm. Then, the test piece for measuring a flexural modulus was left to stand for 24 hours in an 80° C. gear oven to undergo a thermal history treatment. Using the test piece that underwent the thermal history treatment, the flexural modulus was measured in accordance with ISO 178.

<Impact Resistance (Charpy Impact Strength)>

Each of the pellets of the resin compositions obtained in Examples and Comparative Examples was fed to the screw in-line type injection molding machine, and injection molded into a test piece for measuring Charpy impact strength on the condition of a metal mold temperature of 60° C. The setting temperatures of the four cylinder blocks disposed from the hopper to the nozzle in the screw in-line type injection molding machine were set at 220° C./230° C./245° C./245° C. sequentially from the hopper side to the nozzle side. The test piece 1 shown in FIG. 3 was produced. The width $L_1$ was 65 mm, the width $L_2$ was 40 mm, the width $L_3$ was 22 mm, and the height H was 10 mm. Then, the test piece for measuring Charpy impact strength was left to stand for 24 hours in an 80° C. gear oven to undergo a thermal history treatment. Using the test piece that underwent the thermal history treatment, the Charpy impact strength was measured in accordance with ISO 179.

<Molding Fluidity>

Each of the pellets of the resin compositions obtained in Examples and Comparative Examples was fed to an injection molding machine in which the cylinder temperature was set at 220 to 280° C. and the metal mold temperature was set at 60° C., and a strip of a test piece having a thickness of 1.8 mm was produced. At this time, the gauge pressure when it was 1 mm short was measured, and the pressure was defined as SSP [Short Shot Pressure] (MPa). A smaller value of the SSP was evaluated as higher molding fluidity.

<Flow Marks>

Each of the pellets of the resin compositions obtained in Examples and Comparative Examples was fed to an injection molding machine in which the cylinder temperature was set at 220 to 280° C. and the metal mold temperature set at 60° C., and injection molded into a 15 cm×15 cm×2 mm flat plate (diameter: 1 mm, pin gate). At this time, the presence or absence of flow marks was visually checked, and flow marks were evaluated on the following determination criteria.

A: no flow marks were found.
B: flow marks were slightly found.
C: many flow marks were found.

<Thermal Creep Resistance>

Each of the pellets of the resin compositions obtained in Examples and Comparative Examples was fed to a screw in-line type injection molding machine in which the cylinder temperatures were set at 245° C. from the hopper side to the nozzle side, and injection molded on the condition of a metal mold temperature of 60° C. to obtain a test piece for measuring creep. The test piece for measuring creep was left to stand for 24 hours under an 80° C. environment using a gear oven to undergo a thermal history treatment.

The test piece for measuring creep used was a dumbbell molded article (thickness: 1 mm) having a shape shown in FIG. 3. FIG. 3 is a simplified front view showing the test piece used in Examples. The test piece 1 had a width $L_1$ of 65 mm, a width $L_2$ of 40 mm, a width $L_3$ of 22 mm, and a height H of 10 mm.

Then, the test piece for measuring creep was left to stand for 24 hours in an 80° C. gear oven to undergo a thermal history treatment.

The test piece for measuring creep after the thermal history treatment was subjected to creep measurement. Using a creep tester (made by YASUDA SEIKI SEISAKUSHO, LTD., "145-B-PC type"), the creep measurement (thermal creep resistance test) was performed on the condition of a distance between chucks of 40 mm, a test load equivalent to a stress of 7.35 MPa, a test temperature of 60° C., and a test time of 500 hours. The thermal creep resistance was evaluated by the distortion [%] determined by the following equation. A distortion [%] less than 10% was determined as acceptable.

Distortion[%]=(displacement of test piece after 500 hours)/(distance between chucks)×100

<Thermal Aging Property>

Each of the pellets of the resin compositions obtained in Examples and Comparative Examples was fed to the screw in-line type injection molding machine, and injection molded on the condition of a metal mold temperature of 60° C. to obtain a test piece for measuring tensile strength. The setting temperatures of the four cylinder blocks disposed from the hopper to the nozzle in the screw in-line type injection molding machine were set at 220° C./230° C./245° C./245° C. sequentially from the hopper side to the nozzle side. The obtained test piece for measuring tensile strength was left to stand for 24 hours under an 80° C. environment using a gear oven to undergo a thermal history treatment.

The test piece for measuring tensile strength after the thermal history treatment was aged for 1,000 hours under a 120° C. environment using a gear oven.

As the measurement of the thermal aging property, the test piece for measuring tensile strength after the thermal history treatment and after the aging was subjected to a tensile test (ISO 527). The thermal aging property of the resin composition was evaluated based on the tensile strength retention rate determined by the following equation.

Tensile strength retention rate[%]=(tensile strength after aging)/(tensile strength after thermal history treatment)×100

<Molding Stability>

In each of the pellets of the resin compositions obtained in Examples and Comparative Examples, the MFR was measured in accordance with ISO 1133 on the condition (1) of a temperature: 250° C. and a load: 10 kg and the condition (2) of a temperature of 270° C. and a load: 10 kg. The molding stability of the resin composition was evaluated based on the MFR retention rate determined by the following equation.

MFR retention rate[%]=MFR value determined on condition(1)/MFR value determined on condition (2)×100

<Measurement of Molecular Weight and Molecular Weight Distribution of Polypropylene Resin Component (a)>

The component (a) was extracted from each of the resin compositions obtained in Examples 12 to 17 and Comparative Examples 7 to 9 by the same method as that in Examples 1 to 11 and Comparative Examples 1 to 6. The molecular weight properties (molecular weight distribution (weight average molecular weight (Mw)/number average molecular weight (Mn)), proportion of the component having a molecular weight of 30,000 or less, and proportion of the component having a molecular weight of 10,000,000 or more) of the extracted component (a) also were measured by the same method as that in Examples 1 to 11 and Comparative Examples 1 to 6.

The results in Examples 12 to 17 and Comparative Examples 7 to 9 are shown in Table 3.

TABLE 3

| | | | | Example 12 | Example 13 | Example 14 | Example 15 | Example 16 | Example 17 | Comparative Example 7 | Comparative Example 8 | Comparative Example 9 |
|---|---|---|---|---|---|---|---|---|---|---|---|---|
| | | Kind | | | | | | | | | | |
| First raw material feeding port | Component (a) | (a-1-1) | Parts by mass | | | | | | | | | |
| | | (a-2-1) | | 10 | 5 | | | 10 | 17.5 | | | |
| | | (a-3-1) | | | | | | | | | | |
| | | (a-4-1) | | | | | | | | | | 10 |
| | Component (b) | Polyphenylene ether | | 50 | 50 | 50 | 50 | 30 | 50 | 50 | 50 | 50 |
| | Component (c) | Hydrogenated block copolymer | | 10 | 10 | 10 | 10 | 8 | 10 | 10 | 10 | 10 |
| | Component (d) | Talc | | | | | | | | | | |
| Second raw material feeding port | Component (a) | (a-1-1) | | 40 | 40 | 40 | 50 | 60 | 32.5 | | | 40 |
| | | (a-2-1) | | | 5 | 10 | | | | | 10 | |
| | | (a-3-1) | | | | | | | | 50 | 40 | |
| | | (a-4-1) | | | | | | | | | | |
| | Component (b) | Polyphenylene ether | | | | | | | | | | |
| | Component (c) | Hydrogenated block copolymer | | | | | | | | | | |
| | Component (d) | Talc | | 27.5 | 27.5 | 27.5 | 27.5 | 27.5 | 27.5 | 27.5 | 27.5 | 27.5 |
| | (a-1-1)/(a-2-1) | | wt/wt | 80/20 | 80/20 | 80/20 | 100/0 | 86/14 | 65/35 | — | 0/100 | 100/0 |
| Physical properties of resin composition | Proportion of component having molecular weight of 30,000 or less in component (a) | | % | 4.4 | 4.6 | 4.8 | 3.5 | 4.5 | 5.0 | 6.2 | 6.3 | 5.3 |
| | Proportion of component having molecular weight of 10,000,000 or more in component (a) | | % | 1.2 | 1.2 | 1.2 | 1.5 | 1.4 | 1.0 | 2.5 | 2.3 | 1.1 |
| | Molecular weight distribution (Mw/Mn) of component (a) in resin composition | | — | 8.7 | 8.9 | 9.4 | 8.2 | 8.8 | 9.5 | 14.1 | 14 | 9.7 |
| | MFR | | g/10 min | 3.9 | 3.9 | 4.0 | 3.0 | 5.4 | 4.5 | 3.9 | 4.0 | 4.2 |
| | Flexural modulus | | MPa | 2930 | 2950 | 2920 | 2950 | 2930 | 2900 | 2960 | 2920 | 2330 |
| | Charpy impact strength | | KJ/m2 | 7.5 | 7.5 | 7.6 | 7.5 | 7.8 | 6.1 | 7.4 | 7.4 | 7.3 |

TABLE 3-continued

| Kind | | Example 12 | Example 13 | Example 14 | Example 15 | Example 16 | Example 17 | Comparative Example 7 | Comparative Example 8 | Comparative Example 9 |
|---|---|---|---|---|---|---|---|---|---|---|
| Molding fluidity (SSP value) | MPa | 40 | 40 | 41 | 44 | 35 | 40 | 45 | 44 | 39 |
| Flow marks | | A | B | A-B | A | A | B | C | C | C |
| Thermal creep resistance | % | 1.3 | 1.3 | 1.4 | 1.2 | 1.3 | 1.3 | 1.2 | 1.4 | 1.3 |
| Thermal aging property (tensile strength retention rate) | % | 94 | 94 | 92 | 95 | 96 | 91 | 85 | 85 | 87 |
| Molding stability (MFR retention rate) | % | 84 | 83 | 81 | 85 | 83 | 80 | 76 | 77 | 78 |

It was found that the resin compositions in Examples 12 to 17 had a better balance among at least molding fluidity, thermal creep resistance, the thermal aging property, and molding stability than that of the resin compositions in Comparative Examples 7 to 9. Furthermore, it was also found that the resin compositions in Examples 12 to 17 had higher rigidity, impact resistance, and molding fluidity, and reduced flow marks at the same time. In contrast, it was found that in the resin compositions in Comparative Examples 7 to 9, at least one of rigidity, impact resistance, molding fluidity, and flow marks was inferior.

The present application is based on Japanese Patent Application No. 2011-149433 filed with Japan Patent Office on Jul. 5, 2011 and Japanese Patent Application No. 2012-031540 filed with Japan Patent Office on Feb. 16, 2012, the contents of which are incorporated herein by reference.

Industrial Applicability

The resin composition according to the present invention can be suitably used as a material for secondary battery containers for nickel-hydrogen batteries, for example.

What is claimed is:

1. A resin composition, comprising:
   100 parts by mass in total of a polypropylene resin (a) and a polyphenylene ether resin (b), and
   1 to 20 parts by mass of a compatibilizer (c),
   wherein in the component (a),
   a proportion of a component having a molecular weight of 30,000 or less, which is determined by gel permeation chromatography (GPC, mobile phase: o-dichlorobenzene, standard substance: polystyrene), is from 3.0 to 5.1% of the entire component (a), and a proportion of a component having a molecular weight of 10,000,000 or more is from 1.0 to 1.6% of the entire component (a).

2. The resin composition according to claim 1, further comprising 5 to 50 parts by mass of a filler (d) based on 100 parts by mass in total of the component (a) and the component (b).

3. The resin composition according to claim 1, wherein molecular weight distribution of the component (a) (weight average molecular weight (Mw)/number average molecular weight (Mn)) is from 8 to 11.

4. The resin composition according to claim 1, wherein the component (c) is one or more selected from the group consisting of hydrogenated block copolymers, copolymers having polystyrene-polyolefin chain, and copolymers having polyphenylene ether-polyolefin chain.

5. The resin composition according to claim 1, wherein the component (c) is a hydrogenated block copolymer prepared by hydrogenating at least part of a block copolymer including a polymer block A mainly containing a vinyl aromatic compound and a polymer block B mainly containing a conjugated diene compound in which a total amount of an amount of 1,2-vinyl bonding and an amount of 3,4-vinyl bonding is from 30 to 90% based on a total amount of an amount of vinyl bonding contained in the conjugated diene compound that forms the polymer block.

6. The resin composition according to claim 5, wherein in the polymer block B, the total amount of the amount of 1,2-vinyl bonding and the amount of 3,4-vinyl bonding is from 65 to 90% based on the total amount of the amount of vinyl bonding contained in the conjugated diene compound that forms the polymer block.

7. The resin composition according to claim 2, wherein the component (d) is talc.

8. The resin composition according to claim 1, having a matrix phase comprising the component (a) and a dispersed phase comprising the component (b).

9. A molded article comprising the resin composition according to claim 1.

10. A method of producing the resin composition according to claim 1, wherein the component (a) comprises a polypropylene resin (a-1): a melt flow rate (230° C., load: 2.16 kg) of 0.1 to 1 g/10 min, and a polypropylene resin (a-2): a melt flow rate (230° C., load: 2.16 kg) of 4 to 9 g/10 min, and
   a mass ratio ((a-1)/(a-2)) of the component (a-1) to the component (a-2) is from 75/25 to 90/10,
   the method comprising steps (1-1) and (1-2):
   step (1-1): a step of melt kneading the component (a-2), the component (b), and the component (c) to obtain a kneaded product, and
   step (1-2): a step of adding the component (a-1) to the kneaded product obtained in step (1-1), and performing melt kneading.

11. A method of producing the resin composition according to claim 1, wherein the component (a) comprises a polypropylene resin (a-1): a melt flow rate (230° C., load: 2.16 kg) of 0.1 to 1 g/10 min, and a polypropylene resin (a-2): a melt flow rate (230° C., load: 2.16 kg) of 4 to 9 g/10 min, and
   a weight ratio ((a-1)/(a-2)) of the component (a-1) to the component (a-2) is from 75/25 to 90/10,
   the method comprising steps (2-1) and (2-2):
   step (2-1): a step of melt kneading part of the component (a-2), the component (b), and the component (c) to obtain a kneaded product, and
   step (2-2): a step of adding the rest of the component (a-2) and the component (a-1) to the kneaded product obtained in step (2-1), and performing melt kneading.

12. A method of producing the resin composition according to claim 2, wherein the component (a) comprises a polypropylene resin (a-1): a melt flow rate (230° C., load: 2.16 kg) of 0.1 to 1 g/10 min, and a polypropylene resin (a-2): a melt flow rate (230° C., load: 2.16 kg) of 4 to 9 g/10 min, and
   a weight ratio ((a-1)/(a-2)) of the component (a-1) to the component (a-2) is from 70/30 to 90/10, the method comprising steps (3-1), (3-2), and (3-3):

step (3-1): a step of melt kneading the whole of the component (a-2), the whole of the component (b), and part or the whole of the component (c) to obtain a kneaded product, step (3-2): a step of adding the whole of the component (a-1), part or the whole of the component (d), and the rest of the component (c) (excluding when the whole of the component (c) is used in step (3-1)) to the kneaded product obtained in step (3-1), and performing melt kneading to obtain a kneaded product, and step (3-3): a step of adding the rest of the component (d) (excluding when the whole of the component (d) is used in step (3-2)) to the kneaded product obtained in step (3-2), and performing melt kneading.

13. A method of producing the resin composition according to claim 2, wherein the component (a) comprises a polypropylene resin (a-1): a melt flow rate (230° C., load: 2.16 kg) of 0.1 to 1 g/10 min, and a polypropylene resin (a-2): a melt flow rate (230° C., load: 2.16 kg) of 4 to 9 g/10 min, and a weight ratio ((a-1)/(a-2)) of the component (a-1) to the component (a-2) is from 70/30 to 90/10, the method comprising steps (4-1), (4-2), and (4-3):

step (4-1): a step of melt kneading part of the component (a-2), the whole of the component (b), and part or the whole of the component (c) to obtain a kneaded product, step (4-2): a step of adding the rest of the component (a-2), the rest of the component (c) (excluding when the whole of the component (c) is used in step (4-1)), the whole of the component (a-1), and part or the whole of the component (d) to the kneaded product obtained in step (4-1), and performing melt kneading to obtain a kneaded product, and step (4-3): a step of adding the rest of the component (d) (excluding when the whole of the component (d) is used in step (4-2)) to the kneaded product obtained in step (4-2), and performing melt kneading.

14. A resin composition obtained by the method according to claim 10.

15. A resin composition, comprising 100 parts by mass in total of a polypropylene resin (a) and a polyphenylene ether resin (b), 1 to 20 parts by mass of a compatibilizer (c), and 5 to 50 parts by mass of a filler (d), wherein in the component (a), a proportion of a component having a molecular weight of 30,000 or less, which is determined by gel permeation chromatography (GPC, mobile phase: o-dichlorobenzene, standard substance: polystyrene), is from 1.0 to 5.1% of the entire component (a), and a proportion of a component having a molecular weight of 10,000,000 or more is from 0.5 to 1.6% of the entire component (a).

* * * * *